(12) United States Patent
Hogan et al.

(10) Patent No.: US 7,945,478 B2
(45) Date of Patent: May 17, 2011

(54) HISTORICAL VEHICLE PARTS DATABASE SYSTEM

(75) Inventors: Dennis Hogan, Spring Grove, IL (US); Jeffrey J Hogan, Glenview, IL (US)

(73) Assignee: HyperQuest, Inc., Buffalo Groves, IL (US)

( * ) Notice: Subject to any disclaimer, the term of this patent is extended or adjusted under 35 U.S.C. 154(b) by 0 days.

(21) Appl. No.: 12/726,221

(22) Filed: Mar. 17, 2010

(65) Prior Publication Data

US 2010/0191621 A1 Jul. 29, 2010

Related U.S. Application Data

(63) Continuation of application No. 11/928,570, filed on Oct. 30, 2007.

(60) Provisional application No. 60/855,851, filed on Oct. 31, 2006.

(51) Int. Cl.
| | |
|---|---|
| G06Q 10/00 | (2006.01) |
| G06Q 40/00 | (2006.01) |
| G06F 17/30 | (2006.01) |
| G07G 1/00 | (2006.01) |
| A01K 5/02 | (2006.01) |
| G06F 17/50 | (2006.01) |
| G06Q 30/00 | (2006.01) |
| G06Q 20/00 | (2006.01) |

(52) U.S. Cl. ............ 705/20; 705/1.1; 705/4; 705/10; 705/28; 705/29

(58) Field of Classification Search ............ 705/1.1, 705/4, 10, 20, 28, 29
See application file for complete search history.

(56) References Cited

U.S. PATENT DOCUMENTS

| | | | |
|---|---|---|---|
| 5,128,859 | A | 7/1992 | Carbone et al. |
| 5,432,904 | A | 7/1995 | Wong |
| 5,839,112 | A | 11/1998 | Schreitmueller et al. |
| 5,950,169 | A | 9/1999 | Borghesi et al. |
| 6,185,540 | B1 | 2/2001 | Schreitmueller et al. |
| 6,338,045 | B1 | 1/2002 | Pappas |
| 6,523,021 | B1 | 2/2003 | Monberg et al. |
| 6,778,979 | B2 | 8/2004 | Grefenstette et al. |

(Continued)

FOREIGN PATENT DOCUMENTS

CA 2312639 A1 12/2000

(Continued)

OTHER PUBLICATIONS

Audatex in the crunch [automobile insurance damage system] Dentay, E. Source: *Computer Data*, v 5, n 11, 46, Nov. 1980.

(Continued)

*Primary Examiner* — Shahid R Merchant
(74) *Attorney, Agent, or Firm* — Miles & Stockbridge PC; James T. Carmichael; Stephen W. Aycock, II

(57) ABSTRACT

A computer system, method and computer readable media for processing historical vehicle replacement part database queries is disclosed. The system can include a data preprocessing unit, a database server coupled to the data preprocessing unit, a web server and an application server programmed to connect operatively to the database server and to the web server. The application server can be programmed to generate dynamic content including a user interface adapted to receive user input and to output result data based upon a database query result, a subrogation claim accuracy verification result and an independent subrogation claim value.

16 Claims, 25 Drawing Sheets

U.S. PATENT DOCUMENTS

| | | |
|---|---|---|
| 6,792,410 B1 | 9/2004 | Donovan et al. |
| 6,910,024 B2 | 6/2005 | Krishnamurthy et al. |
| 7,010,494 B2 | 3/2006 | Etzioni et al. |
| 7,110,960 B2 | 9/2006 | Phillips et al. |
| 7,249,114 B2 | 7/2007 | Burchetta et al. |
| 7,337,149 B2 | 2/2008 | Blouin et al. |
| 7,546,291 B2 | 6/2009 | Selca et al. |
| 2002/0007289 A1 | 1/2002 | Malin et al. |
| 2002/0016655 A1 | 2/2002 | Joao |
| 2002/0035488 A1 | 3/2002 | Aquila et al. |
| 2002/0049618 A1 | 4/2002 | McClure et al. |
| 2002/0073051 A1 | 6/2002 | Blouin et al. |
| 2002/0082849 A1 | 6/2002 | Tenorio |
| 2002/0087408 A1 | 7/2002 | Burnett |
| 2002/0188467 A1 | 12/2002 | Eke |
| 2003/0028404 A1 | 2/2003 | Herron et al. |
| 2003/0050843 A1 | 3/2003 | Onoue |
| 2003/0154111 A1 | 8/2003 | Dutra et al. |
| 2003/0171959 A1 | 9/2003 | Galloway |
| 2003/0172008 A1 | 9/2003 | Hage et al. |
| 2004/0034566 A1 | 2/2004 | Nagata |
| 2004/0044549 A1 | 3/2004 | Loop |
| 2004/0093241 A1 | 5/2004 | Stone et al. |
| 2004/0111302 A1 | 6/2004 | Falk et al. |
| 2004/0153346 A1 | 8/2004 | Grundel et al. |
| 2004/0243423 A1 | 12/2004 | Rix et al. |
| 2004/0243583 A1 | 12/2004 | Olsen |
| 2004/0254929 A1 | 12/2004 | Isaac |
| 2005/0004819 A1* | 1/2005 | Etzioni et al. ............ 705/5 |
| 2005/0010454 A1 | 1/2005 | Falk et al. |
| 2005/0075912 A1 | 4/2005 | Bealke et al. |
| 2005/0125261 A1* | 6/2005 | Adegan ............ 705/4 |
| 2005/0125311 A1 | 6/2005 | Chidiac |
| 2005/0171867 A1 | 8/2005 | Doonan et al. |
| 2005/0177527 A1 | 8/2005 | Morris et al. |
| 2005/0187834 A1 | 8/2005 | Painter et al. |
| 2005/0197897 A1 | 9/2005 | Veit et al. |
| 2005/0289007 A1 | 12/2005 | Glebe |
| 2006/0036516 A1 | 2/2006 | Glebe |
| 2006/0064393 A1 | 3/2006 | Orr |
| 2006/0106653 A1 | 5/2006 | Lis |
| 2006/0190342 A1 | 8/2006 | Dendl et al. |
| 2006/0195370 A1 | 8/2006 | Howarth |
| 2006/0242089 A1 | 10/2006 | Vahidi et al. |
| 2007/0050311 A1 | 3/2007 | Mohr et al. |
| 2007/0124216 A1 | 5/2007 | Lucas |
| 2007/0179868 A1 | 8/2007 | Bozym |
| 2007/0179869 A1 | 8/2007 | Cochrum |
| 2007/0250415 A1 | 10/2007 | Wilch |
| 2007/0295800 A1 | 12/2007 | Staats |
| 2008/0097796 A1 | 4/2008 | Birchall |
| 2008/0103806 A1 | 5/2008 | Harris |
| 2008/0109128 A1 | 5/2008 | Littooy et al. |
| 2008/0281658 A1 | 11/2008 | Siessman |
| 2010/0257082 A1 | 10/2010 | Foster |

FOREIGN PATENT DOCUMENTS

| | | |
|---|---|---|
| WO | WO 01/39008 | 5/2001 |
| WO | WO 2007127226 A3 | 1/2008 |

OTHER PUBLICATIONS

Vehicle parts information system combined with maintenance information management system, IPCOM000160581D, Nov. 21, 2007.

Third Party component discovery and recall notification, IPCOM000176380D, Nov. 14, 2008.

The Shake-Up in Car Insurance, Henry, Ed. Money. New York: Sep. 1978, vol. 7, Iss. 9; p. 77.

Shifting gears: aftermarket auto parts [Legal action against insurance companies in the US for alleged unauthorized use of aftermarket parts in vehicle repair have bubbled up into Canada], Carr, David. *Canadian Underwriter*. Don Mills: May 2000. vol. 67, Iss. 5; p. 16.

Auto Insurers Could Save Millions in Claims, Haggerty, Alfred G.. *The National Underwriter*. (Property & Casulty Insurance Edition). Cincinnati: Nov. 22, 1985. vol. 89, Iss. 47; p. 50, 2 pgs.

Body/Repair Shop Visits to Determine Distribution of Replacement Parts Sources, Jordan, W. A.; Godley, C.J. (Associated Management Services, Inc., Oxon Hill, MD.) Sponsor: National Highway Traffic Safety Administration, Washington, DC., 28p, Oct. 1989.

Adaptive Quality Assurance (AquA) method and system, IPCOM000190336D, Nov. 24, 2009.

An Overview of recent literature of spare parts inventories, Kennedy et al., International Journal of Production Economics 76, 201-215, 2002.

* cited by examiner

ESTIMATE SUBMITTED

Your estimate transaction number is: 558034.
This transaction number will assist you in retrieving your estimate.
Please print this page or make a note of the number for future reference.
Thank you for choosing HyperQuest.

Click PRINT/Email if you want to print/Email your parts selection

[Print]    Email To: [____]

Loss Cost Adjustment: 7.00

Parts Selections

Claim Number: 12345678
Location (ZIP): 15090
Make/Model: 2000 BUICK LESABRE

BUMPER BRACKET - FRONT
Action Crash Parts-PITTSBURGH 866-677-2767. Available Date: 10/2, 10/3, 10/4, 10/5, 10/6, 10/7, 10/8, 10/9/2006
BUMPER BRACKET FRONT LH LESABRE
Stock Number: 0331751
Quantity: 2    Price (w/Markup): 33.00    Price (wo/Markup): 33.00
Estimated Price: 40.00
Description: BUMPER BRACKET FRONT Loss Cost Adjustment: 7.00    Date Searched: 10/02/2006 - 10/09/20

[Process Another Claim]

Logged to 14 Taloup Drive, WEXFORD, PA, 15090

HyperQuest 847.410.0467    ©2000-2006 HyperQuest. All Rights Reserved.    info@hyperquest.com

HISTORICAL VEHICLE PARTS DATABASE SYSTEM

This application is a continuation of U.S. application Ser. No. 11/928,570 filed on Oct. 30, 2007, and claims priority to U.S. Provisional Application No. 60/855,851 filed on Oct. 31, 2006, the entire contents of which are incorporated herein by reference, including any references cited therein.

Embodiments of the present invention relate generally to historical vehicle parts databases and, more particularly, to a system and method for processing historical vehicle parts search query transactions in a historical vehicle parts availability database system.

According to The Insurance Information Institute, in 1999, operating expenses of the average property and casualty insurer exceeded premiums by over 5%. This indicator has not materially changed in the years since. Inefficiencies and unnecessary expenses in the collision repair and automotive parts industries are typically considered to be the main culprits behind this loss. Historically, insurance companies have been unable to access real-time information on the purchasing practices of collision repair shops; unable to receive more aggressive pricing on parts; and unable to reduce the costs of conducting compliance inspections of repair shop transactions; and unable to confirm availability and quality of parts appearing on repair estimates. Accordingly, insurance companies simply have not had the information and systems they need to control repair expenditures and claim costs. Furthermore, without access to real-time information it has been difficult for the insurance companies to control the proliferation of abuse and fraud. It is estimated that these two activities account for more than 20% of every claim dollar paid by insurance companies.

Property and casualty insurance carriers account for approximately 90%, or $36 billion, of all collision repair payments in the United States, according to Mitchell International, CCC Information Services, the Insurance Information Institute, Nationwide Insurance, GMAC, Prudential and AFG, and further supported with Industry-At-A-Glance Research Reports. The above referenced institutions provide statistics on claim numbers. This financial position provides insurers with considerable leverage over the collision repair industry. But without control over the repair estimating process and without timely and accurate information on the pricing, quality, and availability of parts before a repair begins, insurance companies lose their leverage. In an attempt to retain control, insurance companies audit repair work on a random basis for about one-quarter of all their claims. However, the cost of auditing is substantial, ranging from about $85 to over $1,000 per audit. Audit results indicate that on average repair costs are inflated by over 20%. However, the high cost of auditing restricts insurance companies from auditing more than about 30% of their claims. An audit provides "after the fact" value, but it fails to attack the true issue—how the estimate was initially developed. The inability of insurers to control estimate development and to prevent fraudulent transactions causes the property and casualty insurance industry to overpay on automotive repair claims by $7 billion a year.

A solution is to enable insurance companies to affect behavior of appraisers at the time an estimate is developed by having those appraisers substitute higher priced original equipment ("OEM") parts with less expensive, but like kind and quality aftermarket or recycled products on a real-time basis—thereby enabling an accurate severity cost to be established for the repair estimate. These solutions help insurance companies save money by reducing the cost of the repair, estimated to be $135 per claim, or over $2 billion annually across the P&C Insurance industry. Appraisers and repair shops save time in locating and obtaining parts and avoiding part disputes with the insurance company.

These solutions allow the insurance company to remotely review and audit in real-time each repair estimate written, and to take action on the estimate if it was written out of compliance with the insurance company's guidelines. The insurance company is also capable of reviewing and auditing each repair shop, staff appraiser or independent appraiser in its actual use (or not) of the approved parts. This system creates an audit function that is more accurate, time efficient and less costly than the current periodic physical audit methods, as well as more granular and definitive than any auditing tools provided through estimating software companies. Today, a claims appraiser, in order to save time, will use higher priced OEM parts claiming no availability of alternative parts. Similarly a repair shop can receive payment for an OEM part and actually use a lower quality, less expensive part without the insurance company having the ability to truly verify the situation.

Subrogated claims are another area of claims, both within the P&C industry as well as with self-insured businesses, where tools are needed to assist parties trying to settle claims in a timely manner that are both fair and accurate. Embodiments of the present invention were conceived, in part, to develop a tool to address the inefficiencies within the practice of managing and settling subrogated claims.

The web-based subrogation application creates value throughout the claims process for companies and self-insured's that require historical part availability and documentation support. Embodiments can make both the parties to the subrogation process and appraisers more accountable, thereby saving insurance companies and insured motorists money, and averting potential litigation and arbitration hearings.

Embodiments can provide subrogation specialists and self-insured's with access to real-time data that supports availability of parts on historical dates, enabling parties involved in the claims process to better identify when an appraiser did not accurately utilize parts on an estimate and/or accurately document the cost of parts on the estimate. The net result is a higher number of "agreed" corrections on subrogated claims between parties, reduced arbitration hearings, more frequent refunds of an insured's deductible, and a reduction in premiums for insureds.

Insurance companies subrogate over five million claims annually against other insurance companies. Similarly, more than five million claims are subrogated by companies that are self-insured. Collectively, this represents over $22 billion in repair claims.

Most subrogated claims are six to twelve months old before the subrogation process begins, but the statute of limitations in some states is greater than five years.

All insurance companies and self-insured companies maintain guidelines as to what types of parts can and should be utilized for a repair, what costs are acceptable versus excessive, and what documentation is needed to support best practices in establishing repair costs. Once a claim is subrogated, a demanding party sends the subrogated claim to a responding party. The responding party reviews the claim estimate to confirm it was written with parts and operations that are commercially acceptable. When it appears costs are too high or the wrong types of parts are utilized, the responding party seeks a price adjustment from the demanding party.

To support its request for an adjustment the responding party either:

1. Performs a current search to locate commercially acceptable parts and documents what those parts do cost, or should cost, or 2. Uses knowledge from previous claim and repair experience to guess what commercially acceptable parts should have been available and what the parts and operations costs should have been.

This information is then presented to the demanding party. The responding party will typically request more substantial proof that the parts and prices proposed were actually available on that date in that area.

Some users seek methods to get confirmation on parts availability for historic dates. The method employed is rarely successful and infrequently used. A party that receives a subrogated claim may request a service to verify if parts were available on a given historical date. The service, which may be manual or electronic or a combination of the two, will disperse a request to parts suppliers requesting whether such requested parts were available on the date specified. A part supplier will sometimes respond to such a request, although infrequently and with limited ability to give a definitive answer to the request. The reason a part supplier responds infrequently is because part suppliers only get paid when they sell a part. A request for information does not drive any revenue to the part supplier and in fact takes time away from the personnel that would otherwise be handling calls for orders. The reason a part supplier has limited ability to give definitive answers to a request is because the parts supplier systems are only able to confirm availability if (1) the specific part requested for the specific make, model, and year vehicle was quoted by that specific supplier on that specific day, or (2) if the part requested is in stock at the time of the request by the service and that the specific part was added into inventory on or before the date the service is seeking to confirm availability on. This type of service has had very limited use because of the deficiencies outlined above.

Conventional subrogation processes can result in increased claim cost, increased arbitration hearings, fewer settlements, fewer deductible refunds to insured motorists, and increased premiums to insureds. Embodiments can provide methods for querying a historical vehicle parts database to permit the accurate resolution of insurance claims (including claims against self-insureds).

BRIEF DESCRIPTION OF DRAWINGS

FIG. 12 shows an exemplary insurance manager summary screen.

FIG. 13B illustrates the vehicle selection screen's additional drop-down menus.

FIG. 16 shows an exemplary estimate submitted page.

DETAILED DESCRIPTION

Figure 1:
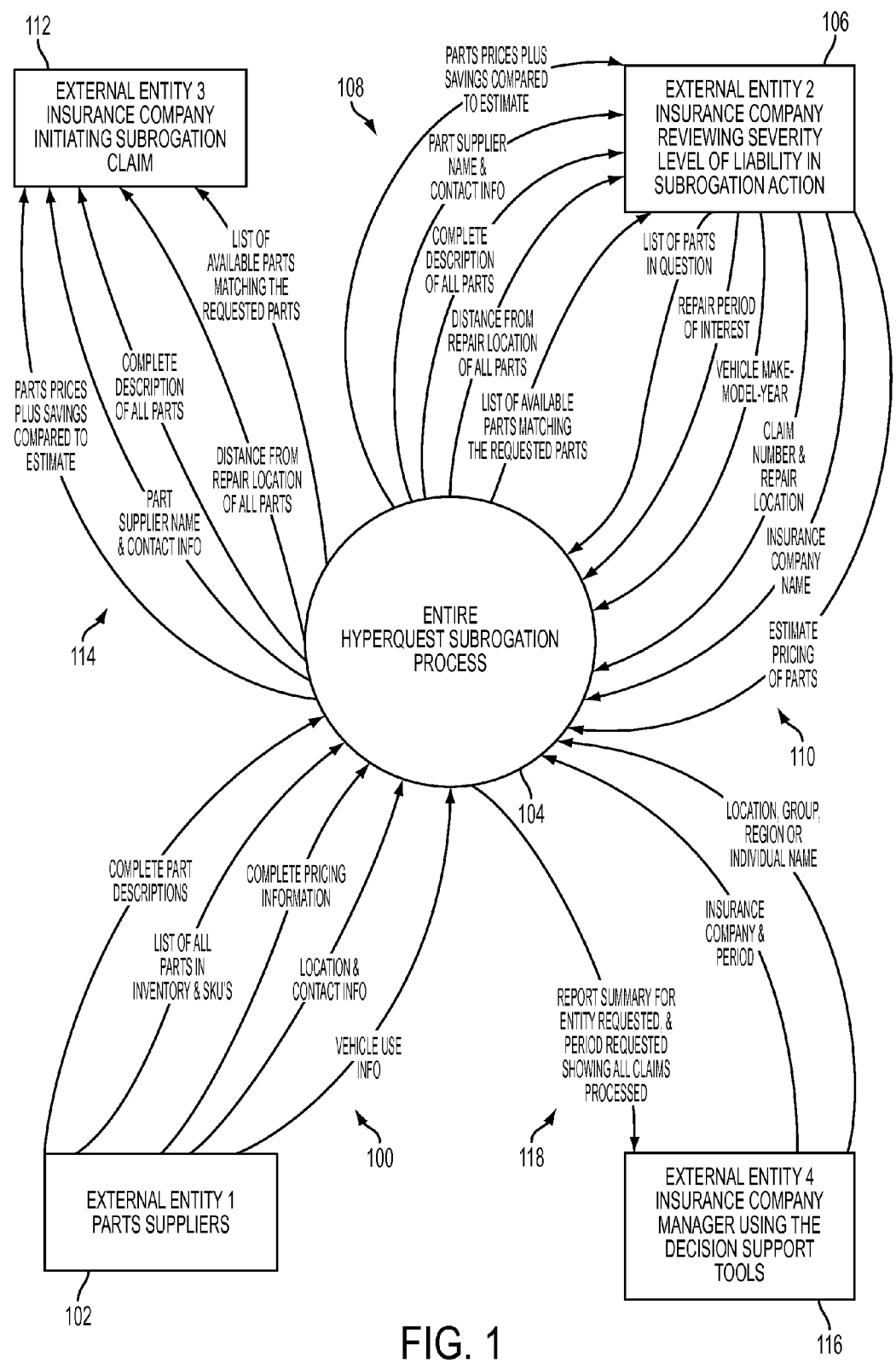
FIG. 1 is a general illustration of an exemplary subrogation process in accordance with the present disclosure.

Embodiments can permit a carrier to perform a parts review on an estimate on a specific historical date or range of dates, and in accordance with its own parts' guidelines or the guidelines of the Insurance Carrier/Self-Insured that subrogated the claim, or against a custom rule set. This allows a party that receives a subrogated claim to conduct a part and price search with confidence on the exact date an estimate was written, and in the same geographic area, versus conducting a search on the current date the subrogated claim was received by the responding party and trying to establish agreement with the demanding party that the parts "most likely" were available on the day an estimate was written, or on some other past date. The system allows for a search for the same data points that were on the original estimate and on the actual date the estimate was written. This allows a party that receives a subrogated claim to conduct a part and price search with confidence on the given day an estimate was written, and in the same area, versus conducting a search on the current date and trying to establish agreement with the subrogating party that the parts "most likely" were available on the day an estimate was written, or on some other past date versus a search for the same data points but on the actual date the estimate was written and/or the repair was completed. An embodiment can establish a common ground by providing an independent service with historical search capability.

In addition to the historical search capabilities, users have access to electronic communication tools that will enable transfer of documentation between the parties. This communication tool is a functional setting that can be dynamically applied to any user through the provisioning functionality. For example, access to all functionality tools can be granted to users based on individual or group classification. An administrator, meaning a user that has administrative rights granted through the provisioning tools can define a level of access and/or communication for a group of users or a single user. The communication capabilities allow a user with rights to electronically communicate/transfer estimate information from the subrogated claim file with required changes identified to an insurance representative or other third party that is involved with or responsible for some level of the subrogated claim. Communication can occur via a direct email that originates from an embodiment, an automated fax that originates from an embodiment, a real-time text communication that originates from an embodiment, or if both the subrogating and subrogated parties are integrated with the system, both the estimate file and search and changes can be communicated through the pages in accordance with the system's ASP model, for example.

One or more embodiments can support download and printing capabilities for correspondence or file support, and reporting for users and managers to identify actual benefit/ performance per user, team, company or specific Carrier. The reporting capabilities replace the manual and non-integrated processes followed by insurance companies and third-party administrators involved in subrogation claims today. An embodiment can permit any user to create a template of reporting that will pull the subrogated claim information and the historical changes requested/required into an online data repository. This functionality enables individual users to eliminate the steps of manually logging subrogated claim information with gross changes agreed to between the parties on spreadsheets, access databases, paper templates, etc. This electronic reporting capability also allows a user and insurance company to track opportunities and changes at the part or line item level of a claim estimate, versus on the aggregate. To further illustrate this point consider today's process where a subrogation specialist will receive a subrogated claim and follow a process so as to determine and communicate what changes need to be made to various line items in a claim estimate. Once the agreement has been reached between the party sending the subrogated claim (the demanding party) and the party receiving the subrogated claim (the responding party), the responding party will notate in some electronic or paper journal the total change to that estimate with some general claim notes and information. No insurance company today can relate an agreed upon change to the line item of an estimate—meaning it is, for example, impossible for an insurance company to determine that of the $126,000,000 saved (reduced payouts due to defending subrogated claims) in the current year, what amount of that savings was attributable to rental issues, parts issues, labor mistakes, incorrect hours for repair functions, etc. Today, an insurance company can only identify that individual representatives have provided journals that indicate the $126,000,000 has been saved and on a specific list of claim files. An embodiment can reduce or eliminate journal entries that deal in aggregate information and can allow tracking on a line item basis. Now through an automated process an insurance carrier or subrogation party can identify on each subrogated claim where costs and savings can and should be derived from, as well as where they have been derived from. This type of information empowers business logic to be deployed that focus an insurer's resources at the types of items on an estimate that cost the most or provide the most savings, versus reviewing items that return or cost very little. The overall process provides such efficiency that it allows for greater throughput of files with fewer people, and at a significantly lower cost to carriers, and with significantly better results for insureds that pay deductibles and premiums.

The reporting capabilities at the management level also allow an insurance company to identify what subrogating insurance carriers are costing them the most. For example, an embodiment can permit an insurance company to identify the number of claims being subrogated from other insurance companies in the industry, the average severity levels, the types of parts, and other related financial and estimate metrics. This type of access to data enables more focused and automated identification of subrogated claims that should be scrutinized, versus those where very little is required. This tracking and measurement capability is another tool designed to facilitate efficiencies in the subrogation process and aid insurance companies identify where representatives should spend time. Additional logic feeds this reporting capability that enables insurers or self-insureds to discern "estimate guidelines" so that the review process can be fully automated and alert both parties of issues and opportunities.

The reporting capability allows management to look at subrogated claims at the aggregate level (all claims and companies), at the company level only, at the company level by user (subrogation specialist managing the specific subrogated claim), and by the vehicle level with further filters that include make, model or year. This data gathering and reporting capability further allows an insurance company to automate the process and also view output reports based upon different aspects of an estimate—by subrogating insurance company. For example, an insurance company manager can use the reporting tools to pull details out of the repository for all claims that contain certain conditions, such as rental over a dollar amount or time period, OEM parts that represent over a set percentage of parts dollars, Total Loss classifications, etc. The report does not limit estimate elements, but allows a user to identify and select any element on an estimate by listing all data codes in the estimate file, such as listed in the industry CIECA standards.

Reporting can be automated, so typos, omitted information, fraudulent reporting, and the like can be reduced or eliminated, providing more accurate, timely and efficient access to data. Once the reports are created by a user, the information can be downloaded into any electronic spreadsheet, word processing system or database software package with a point-and-click function. Additionally, if desired, there are hooks in reporting capabilities that will allow an insurance company to import that information report directly into its claims system.

An embodiment can facilitate a reduced number of arbitrations by more than 50% and will reduce overpayments between parties of more than $2 billion.

Referring to FIG. 1, data transmissions 100 from various commercial recycled, aftermarket, reconditioned, recovered OEM and discounted OEM part suppliers 102 are received at a central processing location 104. These transmissions 100 contain digital representations of each supplier's 102 part inventory, including such things as date of data transmission, part descriptions, stock numbers, categorization information, physical and condition descriptions, make-model-year the part is applicable to, pricing and discount information, location and quantity. These transmissions are received both directly from part suppliers 102 and indirectly through third parties. Transmissions 100 are received via the internet, or via direct line, or via dial up connections, or via a hard copy disc that is absorbed and converted into data elements. The transmissions 100 can be representations of multiple suppliers' or individual supplier's inventory at that point in time. The transmissions can represent the total inventory at that point in time or the change in inventory from the last transmission.

The transmissions from various part suppliers 100, also designated "Sources," are received by central processing location 104 periodically. The frequency of the transmission can be different for various Sources. The present system is designed to accommodate the variability in period, as well as for each Source. The system is designed to accommodate the variability down to one transmission, for one part change, within a random period, or the equivalent of a real-time part update transmission 100. Parts supplier 102 can provide a real-time part feed, and the central processing location can accept, pre-process and log that part's availability in real-time. This means that an embodiment of the present invention can provide accuracy to the second of a part coming into the marketplace and as available and being sold out of the marketplace, and hence no longer available.

All transmissions 100 undergo filtering or preprocessing, based on a rules engine that has rules for various parameters such as part applicability, part usability, part quality, and make-model-year interchangeability. Any and all rule parameters used during filtering and pre-processing can be eliminated based on business design. All filtering takes place in a preprocessing computing machine. Since the database contains aftermarket, reconditioned, recovered OEM, discontinued OEM, and recycled parts, preprocessing takes place as needed depending on the frequency of updates provided by the parts supplier. Preprocessing of the supplier inventory allows for parallel updating of the existing production database while insuring there is minimal down time on the production process.

The new production database is thus updated or created, then moved into the production environment and the database management system is simply pointed to the new database and the changeover is made without production downtime.

All transmissions 100, even partial update transmissions, at times change only non-terminal aspects of part information. A terminal aspect means that the part has been in inventory and for some set of reasons has now left inventory. The system treats terminal events as a transaction completion, i.e., the part entered inventory on a given date and left inventory on the termination event date. The part data and associated fields remain part of a single row in the database. A change in the non-terminal aspect of a part creates a challenge, because the part has not left inventory, but some characteristic/descriptor has changed. A critical criterion of the present system is an accurate representation of the part inventories on the date of interest. This requires that an additional row be started in the database to represent the unique profile change that has taken place in that particular part. This enables the system to show such things as price changes, discount adjustments, or changes to the part description.

The service has a user interface that enables the user to quickly format queries to the database. The interface handles client authentication via the user profile, assigning user rights on the system. The user can query a specific date or a period, one part or multiple parts, and the user can specify the region or local area of interest to the particular claim that is being reviewed. In addition, the user can specify whether the query will be executed without material guidelines, with present day material guidelines, or with material guidelines of the selected period. The query is managed by the database management system.

The user can manually enter the query or have the query automatically delivered if the record is already available in the system. When the service is executed in an automatic fashion—that is, when a user does not manually format the data queries—the queries are formatted by the software extracting the data queries from a stored data file of a report or estimate record. The same queries can be executed in either the manual mode or the automatic mode. If an estimate record is located in the system and a user inputs that claim number, it can be executed. If an estimate filed electronically comes into the system, an automated service can be performed on that record.

The information returned from the query is formatted and returned to the user. The user receives back a listing of parts that were available for sale that day or period, the price, in the local of interest. The user can drill down for additional part information if he/she would like to have additional information.

The external user entity 106, such as a client insurance company that is reviewing the severity level of its liability or potential liability in a subrogation action in evaluating the subrogation situation, through the user interface, contacts the central processing location 104 through data transmissions 110, providing the central processing location 104 with information, for example, as to the list of parts in question, the repair period of interest, the vehicle make, model, year, the claim number and repair location, the name of the insurance company, and the estimated pricing of parts. The central processing location then processes this request and data, and furnishes data transmissions 108 back to the external user entity that initiated the request.

After transmissions 100 have been received by central processing location 104, and then external using entity 106 is connected to the central processing location 104 by use of the aforesaid user interface, data transmissions 108 are sent to the externally using entity. These transmissions include, but are not limited to, parts prices plus savings compared to an estimate, the parts supplier name and contact information, a complete description of all parts, the distance from the repair location of all parts, and the list of available parts matching the requested parts.

In one embodiment, the information received by external user entity 106 via transmissions 108 can be furnished to an opposing insurance company 112 that has initiated a claim, thus allowing external using entity 106 to negotiate a settlement with the insurance company 112 that initiated the claim being reviewed by insurance company 106. Such information would include the data available through transmission 114 in FIG. 1, and includes such data as parts prices plus savings compared to an estimate, parts supplier name and contact information, complete description of all parts, the distance from the repair location of all parts, and the list of available parts matching the requested parts.

In a further embodiment, the transmissions 114 may be furnished to external entity 112 directly from the central processing location 104, as illustrated in FIG. 1.

Referring again to FIG. 1, information to assist a manager of an insurance company 116 in the management of several subrogated claims on an on-going basis can be provided by the central processing location 104. As indicated by data transmissions 118, the insurance company manager 116 provides the central processing location 104 with the name of the insurance company and the period of time involved, as well as the location, group, region or individual name of the manager/insurance company. The central processing location 104 then provides a report to the manager 116 including data covering the requested period and showing all claims processed.

Figure 2:
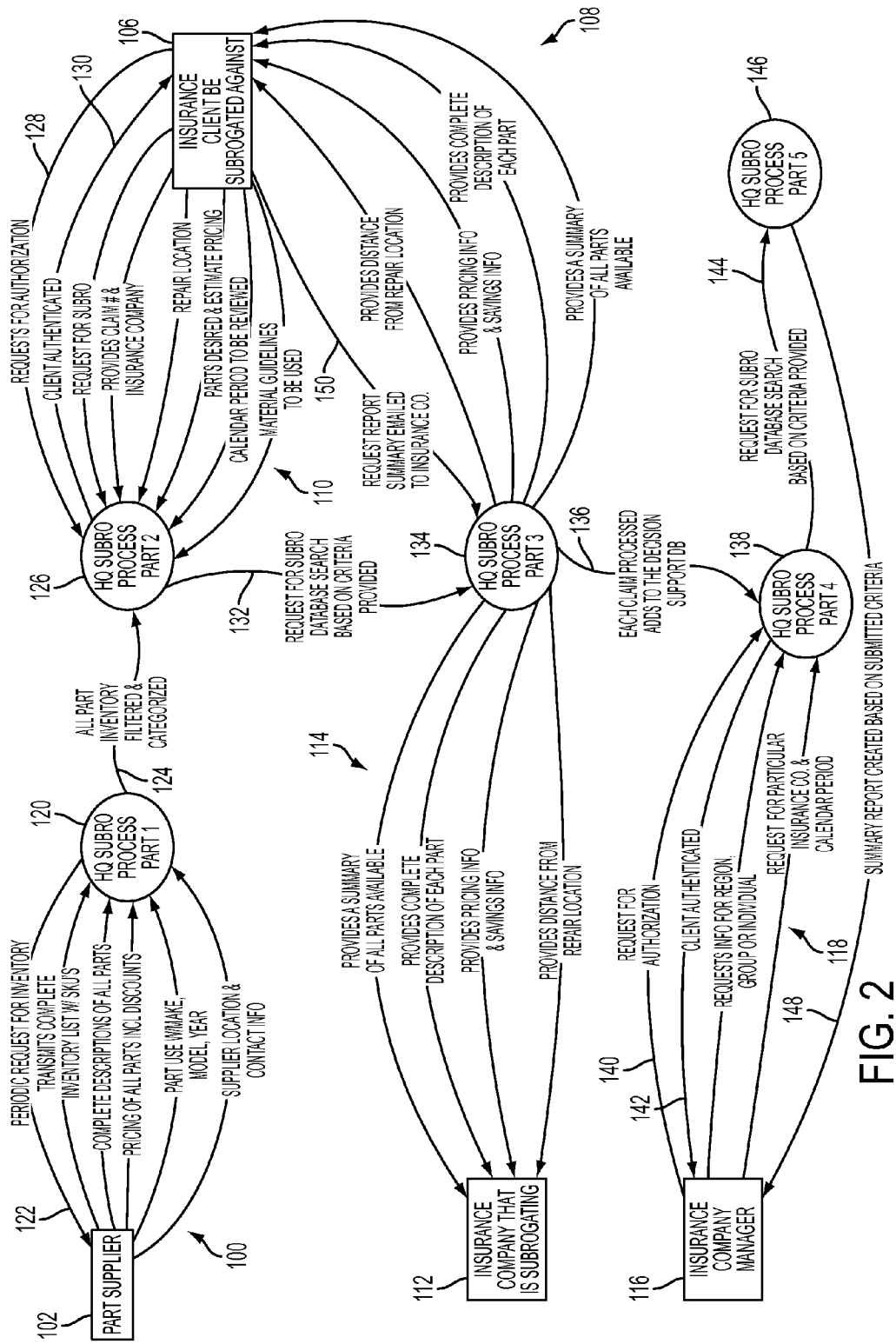
FIG. 2 is a flow diagram showing the operation of the central processing location in further detail.

FIG. 2 represents a more detailed flow diagram showing the operation of the central processing location in further detail. As stated previously, parts suppliers 102 furnish the first subrogation processing part 120 of the central processing location 104 with data transmissions 100. At the same time that parts suppliers 102 are furnishing data 100 to the first part 120 of the central processing location 104, the central processing location via first part 120 is continually and periodically requesting from the parts supplier 102 additional inventory information and updates 122. The parts information received by first part 120 of central processing location 104 then filters and categorizes all part inventory data as shown at 124. This filtered inventory information 124 is then transmitted to the second part 126 of the central processing location 104 where the filtered inventory information 124 is applied to the database 301 (FIG. 3A) in the central processing location 104.

A respondent insurance client 106 reviewing the severity level of liability in a subrogation action initiates an inquiry of the database 302 by submitting a request for authorization 128 to the central processing location 104. If properly submitted, the insurance client 106 receives a return authorization 130 from the central processing location 104. The respondent insurance client 106 then transmits data 110 to the second part 126 of the central processing location 104, namely material guidelines to be used, the calendar period to be reviewed, the parts desired and estimated pricing, the repair location, the claim number and the insurance company that is subrogating the claim, and the request for subrogation. Upon receipt of this transmission 110 from the respondent insurance client 106, the second part 126 sends a request for the search of the subrogation database 302 based upon the criteria furnished by transmission 110 from the insurance client 106. The request is received by the third portion 134 of central processing location 104.

Upon completion of the search of the database 302, data transmissions 108 are furnished from third part 134 of the central processing location 104 to the respondent insurance client 106. This data includes a summary of all parts available, a complete description of each part, pricing information and savings information, and data regarding the distance from the repair location of the parts in question. As mentioned above, in one embodiment, the respondent insurance company client 106 can furnish the information received from the third part 134 of the central processing location 104 directly to the opposing, demanding insurance company 112 that initiated the claim. In the embodiment illustrated in FIG. 2, transmissions 114 are furnished directly from the third part 134 of central processing location 104 to the demanding insurance company 112, including a summary of all parts available, a complete description of each part, pricing information, savings information and the distance of the part from the repair location. By furnishing this information to the demanding insurance company 112 initiating the claim, the respondent insurance client 106 can more efficiently negotiate a favorable (i.e., more accurate) settlement of the claim, with the demanding insurance company 112.

As shown in FIG. 2, data transmission 136 reflecting data as to each claim that is processed is furnished to the fourth part 138 of central processing location 104 to add to the decision-making capability provided by the database 305 at the fourth part 138. In this regard, the insurance company manager 116 submits a request for authorization 140 to fourth part 138 of central processing location 104. Upon receiving authentication 142 from fourth part 138, the insurance company manager then submits transmissions 118 to fourth part 138 requesting information for regional group or individuals, or a request for particular insurance companies and calendar periods that are stored in the database 302 accessible by the fourth part 138 of the central processing location 104. Fourth part 138 then sends a request 144 for a subrogation database search based on the provided criteria. The fifth part 146 of central processing location 104 processes request 144 and submits a summary report 148 that is created based on the submitted criteria and furnishes that data back to the insurance company manager 116, as shown in FIG. 2. The insurance client 106 also requests 150 that a report summary is e-mailed back to insurance company 106.

Figure 3:
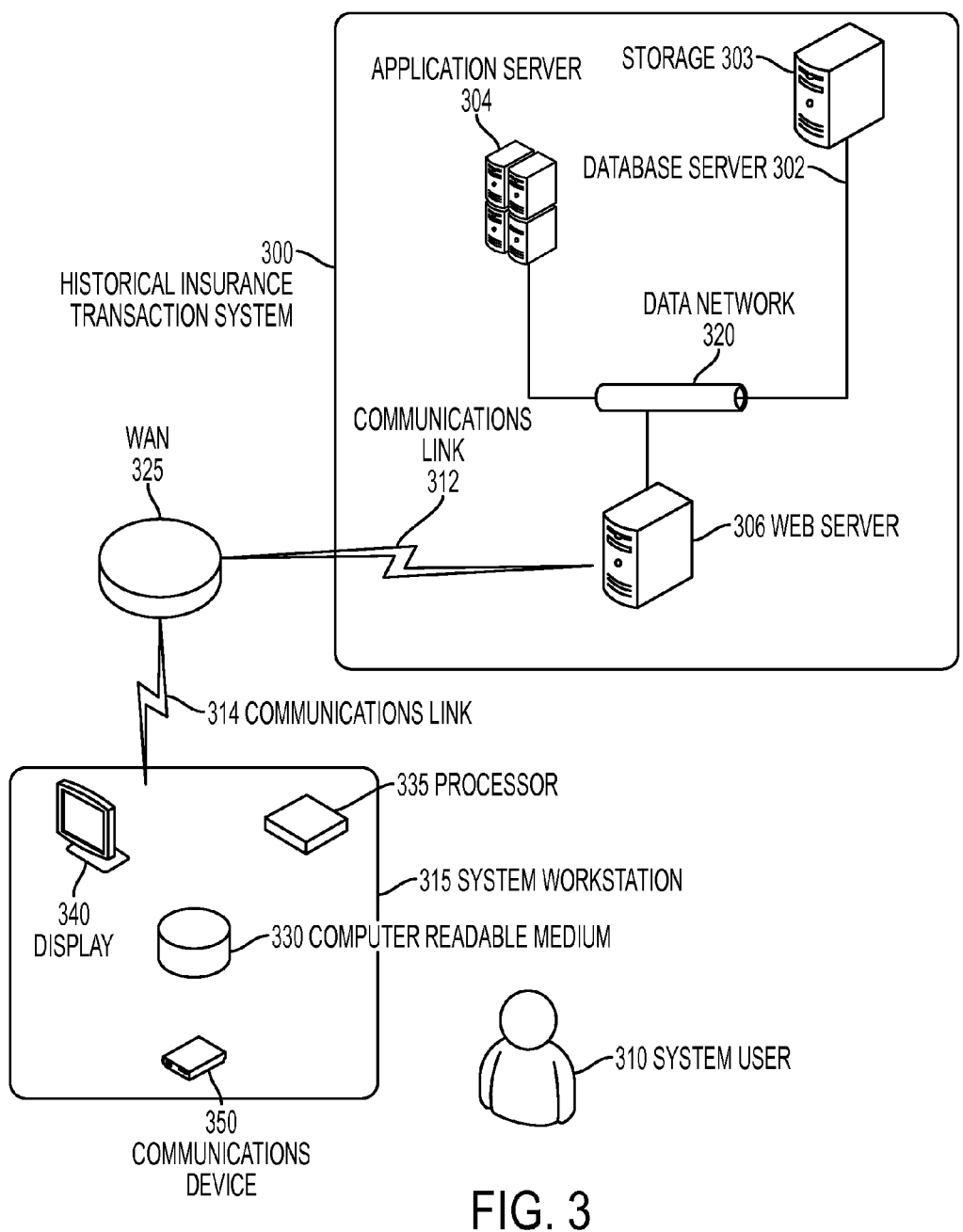
FIG. 3 illustrates a historical insurance transaction system communicatively linked to a WAN.

FIG. 3 illustrates a historical insurance transaction system 300 ("the system 300") communicatively linked to a WAN 325. FIG. 3 further illustrates a system workstation 315 communicatively linked to the WAN 325.

The system workstation 315 includes at least one processor 335, at least one computer readable medium 330, at least one communications device 350 and a display 340. One of skill in the art will appreciate that the system workstation 315 components may be connected via a system bus or via peripheral connections or any combinations thereof. A system user 310 accesses the system 300 via a communication link 314 and the WAN 325.

The system 300 includes at least one web server 306, at least one application server 304 and at least one database server 302, all of which are communicatively attached via a data network 320. One of skill in the art will appreciate that the servers 302, 304 and 306 may be consolidated in any topology and in any permutation. One of skill in the art will further appreciate that the database server 302 accesses at least one storage 303, and that the storage 303 may be local or distributed relative to the data network 320. The system 300 employs a communications link 312 to access the WAN 325, thereby interfacing with external entities, including but not limited to data aggregators, parts suppliers and the system workstation 315.

Figure 4:
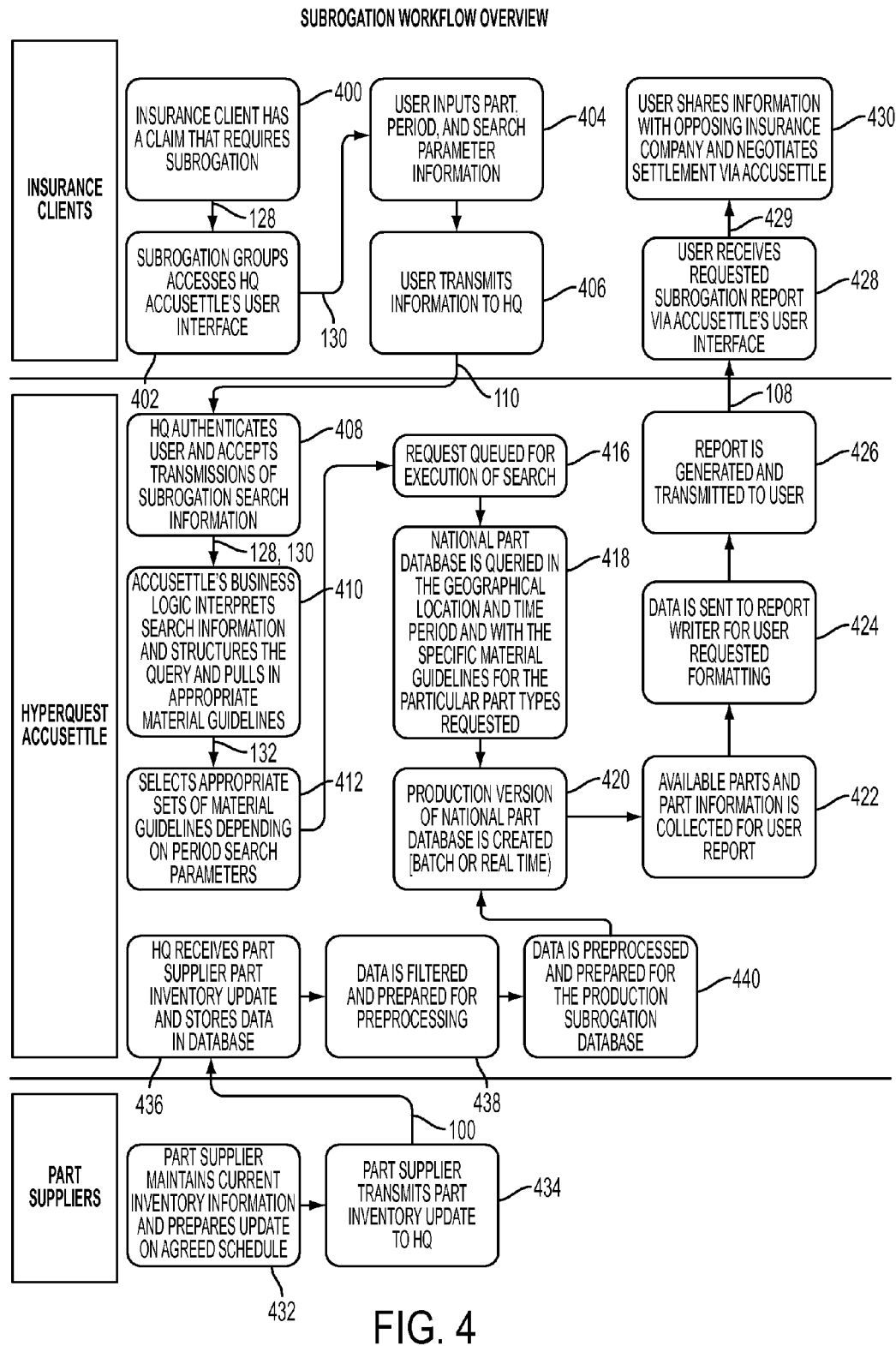
FIG. 4 is a flow diagram showing a subrogation workflow overview.

FIG. 4 is a flow diagram showing a subrogation workflow overview. The process initiated by an insurance client 400 that has a claim that requires subrogation. The insurance client 400 then submits a request for authorization 128 (FIG. 1) to access 402 the central processing location 104 through the user interface of the central processing location. The user, after being authenticated 130, inputs 404 part, time period and search parameter information into the central processing location 104. The user then transmits 406 the information to the central processing location 104 via data transmission path 110. The central processing location 104 then authenticates 408 the user and accepts transmission of subrogation search information. This information is transmitted 128, 130 to another portion of the central processing location that interprets 410 the business logic search information, structures the query and pulls in appropriate material guidelines. This data is then transmitted 132 to the third part 134 of central processing location 104 to select 412 appropriate sets of material guidelines depending on time period search parameters. The request is queued 416 for execution of the search. The national part database is then queried 418 in the geographical location and time period and with a specific material guidelines for the particular part types requested. A production version of the national part database is created 420, with the production schedule being batch or real time. The database 302 then collects 422 available parts and part information for a user report. The data is then sent to a report writer 424 for user requested formatting. Next, a report is generated 426 and transmitted to the user 310 via data transmission 108.

The user receives 428 the requested subrogation report via the user interface of the central processing location 104. Via transmission 429, in one embodiment, the user shares 430 information with the opposing insurance company 112 that initiated the claim, and insurance client 106 then negotiates settlement using the data provided by the central processing location 104.

Referring to FIG. 4, the process for maintaining the database 302 up to date with parts data begins when the parts supplier maintains 432 current inventory information regarding parts, and prepares an update of such information on an agreed schedule. The parts supplier then transmits 434 the part inventory and the updates to the central processing location 104 via transmission 100. The central processing location 104 then receives 436 the supplier part inventory update and stores the data in the database 302. This data is then filtered 438 and prepared for pre-processing, and is pre-processed and prepared 440 for the production subrogation database 302. This information is then furnished to the database 302 shown in block 420 in FIG. 4.

Figure 5:
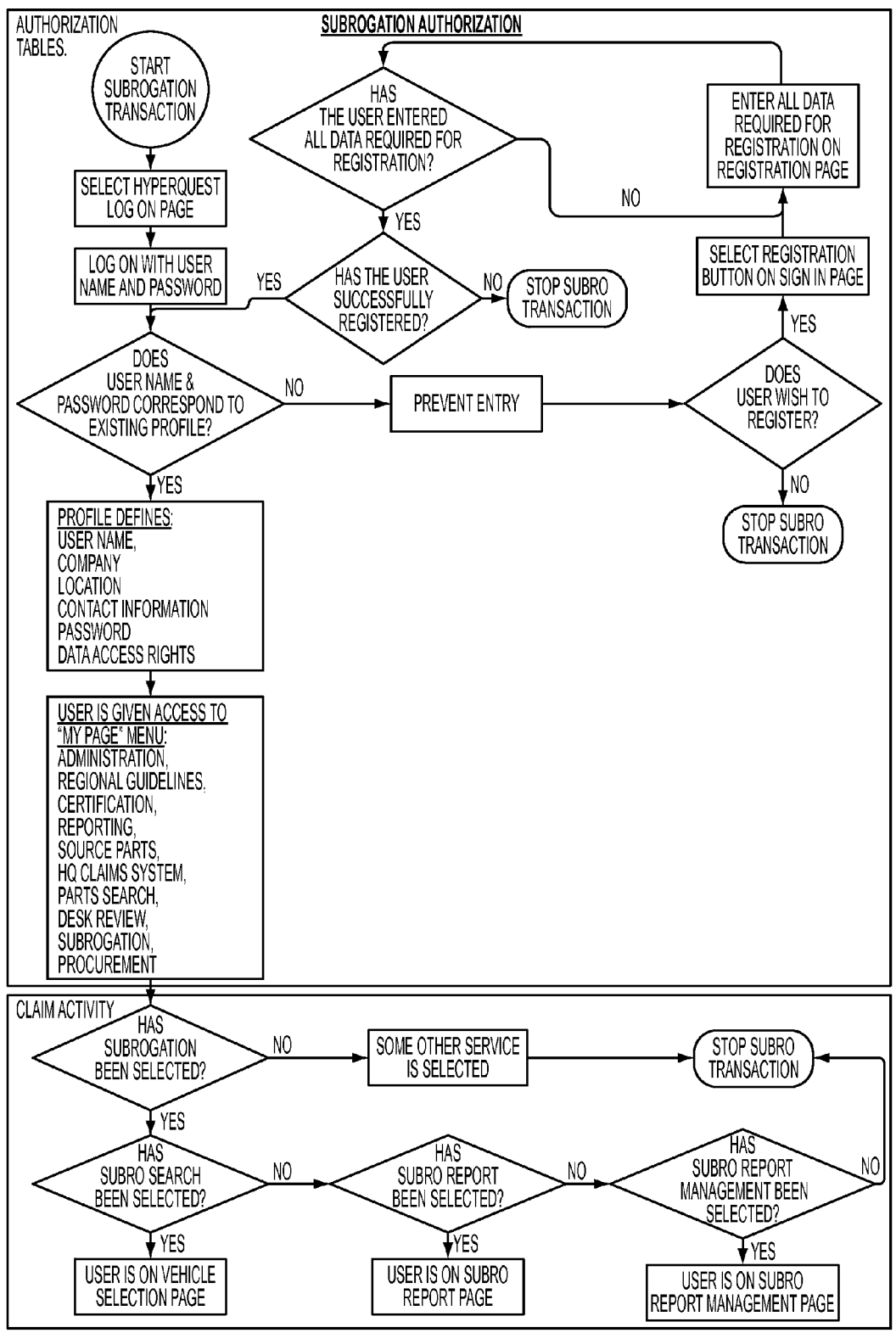
FIG. 5 is a flow diagram representing the subrogation authorization process initiated by the external using entity.

FIG. 5 is a flow diagram representing the subrogation authorization process initiated by the external using entity 106 (FIG. 1). To start a subrogation transaction, the using entity 106 accesses the log-in page associated with the computers at central processing location 104. The user 310 logs in with their name and password, and if the name and password corresponds to an existing profile, the user is given access to a "my page" menu. The user profile defines the user name, company, location, contact information, password and data access rights set by rules embedded in the system 300. As also seen in FIG. 5, if the user cannot enter a proper name and password, entry is prevented but the user is also given the opportunity to register. If the user decides to register and submits all the required information, the user is then provided access to the "my page" menu. If no name and password is entered into the system, the subrogation transaction is halted.

Referring to the claim activity portion of FIG. 5, if the subrogation option has been selected from the "my page" menu, the using entity 106 is then given the option to initiate a subrogation search. If the subrogation search is initiated, the using entity 106 is advanced to the vehicle selection page. If the subrogation search is not selected, and the user has selected the subrogation report option, the user is advanced to the subrogation report page. Also, if the using entity 106 selects the subrogation report management option, the user is advanced to the subrogation report managing page.

Figure 6A:
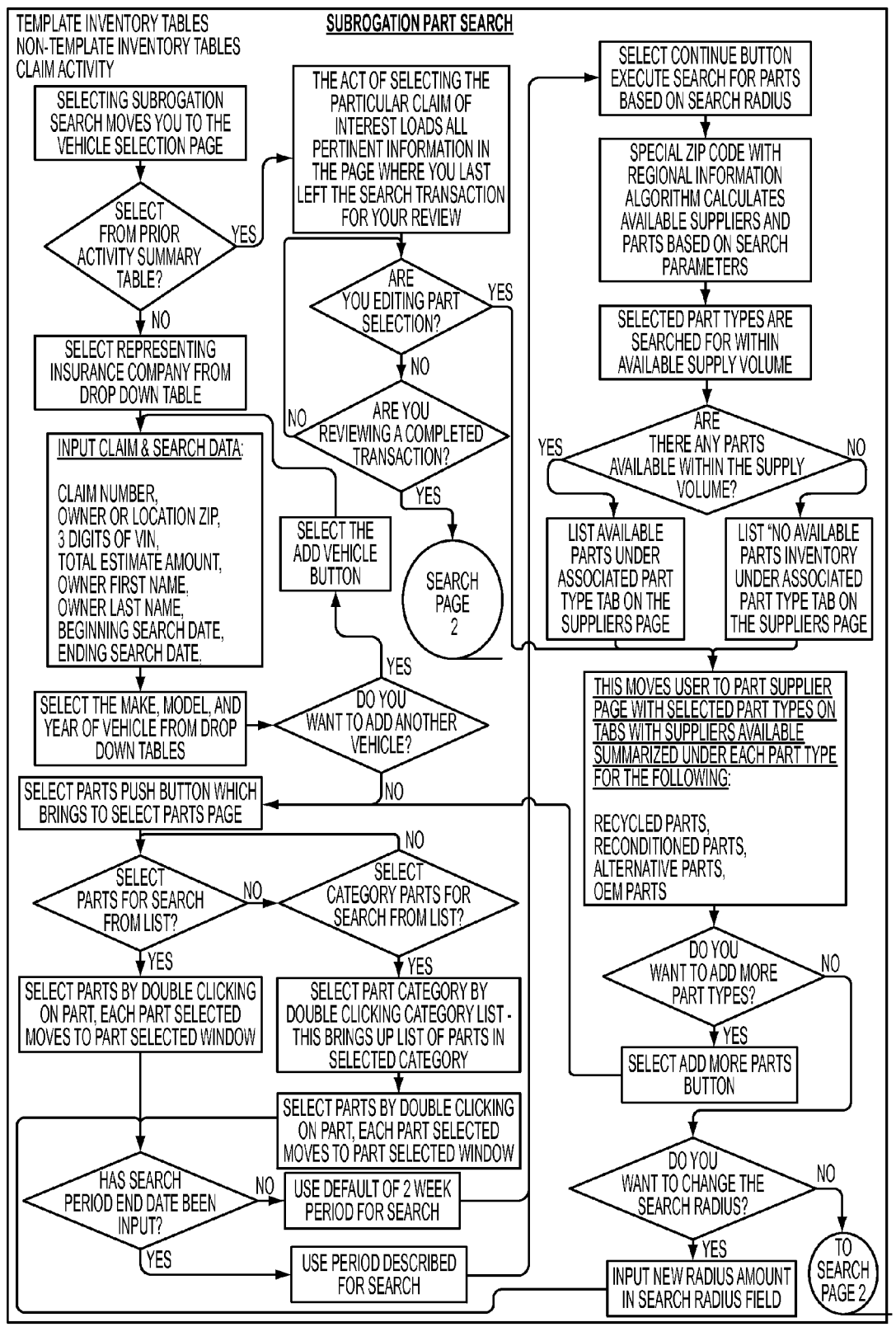
FIG. 6A shows an exemplary subrogation part search vehicle selection page.

The process used in the subrogation system 300 continues from the vehicle selection page as initially illustrated in FIG. 6A. This is the subrogation part search of the process. Once at the vehicle selection page, the using entity 106 selects from a prior activity summary table. If there has been no prior activity by this user, the using entity 106 selects the insurance company that initiated the claim against the using entity 106 from a drop-down table. This table allows the using entity to insert the claim number, owner or location zip code, five digits of the vehicle identification number, the total repair estimate amount, the vehicle owner's first and last name, the beginning search date and the ending search date. Then the user is prompted to select the make, model and year of the vehicle from drop-down tables, with the option of adding a second vehicle if desired. If a new vehicle is added, another drop-down table appears wherein additional information about the second vehicle is inserted.

If the using entity 106 indicates that no additional vehicle is to be added, the user activates a push button to select parts, which brings the select parts page to the screen. The user then indicates whether it desires to select parts for the search from the list. If yes, the user selects the parts by double clicking on the part, and each part that is selected is moved to a part selected window. The user also has the option to select category parts for the search from a list by double clicking a category list, bringing up a list of parts in a selected category. Parts are then selected by double clicking on the part, each part selected moving to the part selected window. In either case, whether the parts are selected from the parts list or from a category of parts list, the process inquires whether a search period end date has been inputted into the system. If no, a two-week default period for the search is entered into the system. If the search period end date has been inputted, the period described for the search is entered into the system.

After the search period has been defined, the using entity 106 selects the continue button that executes the search for the parts based on a search radius. A special zip code with regional information algorithm calculates available suppliers and parts based on the search parameters in the system 300. Selected part types are searched for availability and supply volume within the geographic area. The system then inquires whether there are any parts available within the supply volume. If the answer is no, a list of "no available" parts inventory is made under associated part type tabs on the supplier's page. If parts are available within the supply volume, a list of available parts under the associated part type tab is created on the supplier's page. In either instance, the user is moved to the part supplier page with selected part types on tabs with available suppliers summarized under each part type, such as: recycle parts, reconditioned parts, alternative parts, OEM (original equipment manufacture) parts.

The user is then inquired whether they want to add more part types. If yes, the user selects the "add more parts" button, and the data is sent to the previously defined push button to select parts, which brings the user to the select parts page. If the user indicates that no additional parts are to be added, the user is inquired as to whether to change the search radius. If yes, a new radius amount is input into the search radius field, and that data is furnished back to the inquiry whether the search period end data has been input into the system, as previously defined. If the user entity indicates that it does not want to change the search radius, a data page appears showing the following information on the supplier page under tabs of selected part types: the suppliers company name and contact information, part description, SKU, price with markup, price without markup, and quantity.

The user 310 is then inquired as to whether the parts suppliers have been selected from a part type tab. If yes, a particular parts supplier has been copied and the quantity of one has been marked, and the estimate part description window is open. The user is then asked again whether the estimate description had been filled out. If the answer is no, the savings calculation cannot be shown. If the answer is yes, information in the two fields of "part description" and "estimate price" can be used for savings calculation.

The user is then inquired as to whether all part type tab parts have been selected. If yes, all selected parts supplier information is shown at the bottom of the page window. The user is then given the option to continue the process, which moves the user to the estimate page. The parts selection header on the estimate page displays the following information: the claim number, location, name and model of the vehicle, total loss adjustment figure and date searched. Within the parts selection window under the header, the individual parts selected are listed with the following information for each part selected: part name and orientation, part loss cost adjustment, supplier name and contact information, part distance from vehicle, available dates within search period, part description, part stock number, part quantity, price with markup, price without markup, and estimate price. The using entity 106 then has the option of printing the part selected information, e-mailing the parts selection information to a third party. The user is then asked whether it desires to process another claim, and if the answer is yes, the user is returned to the vehicle selection page. If the user indicates it does not desire to process another claim, the subrogation part search is completed, returning to "my page" or to "log out."

Figure 6B:
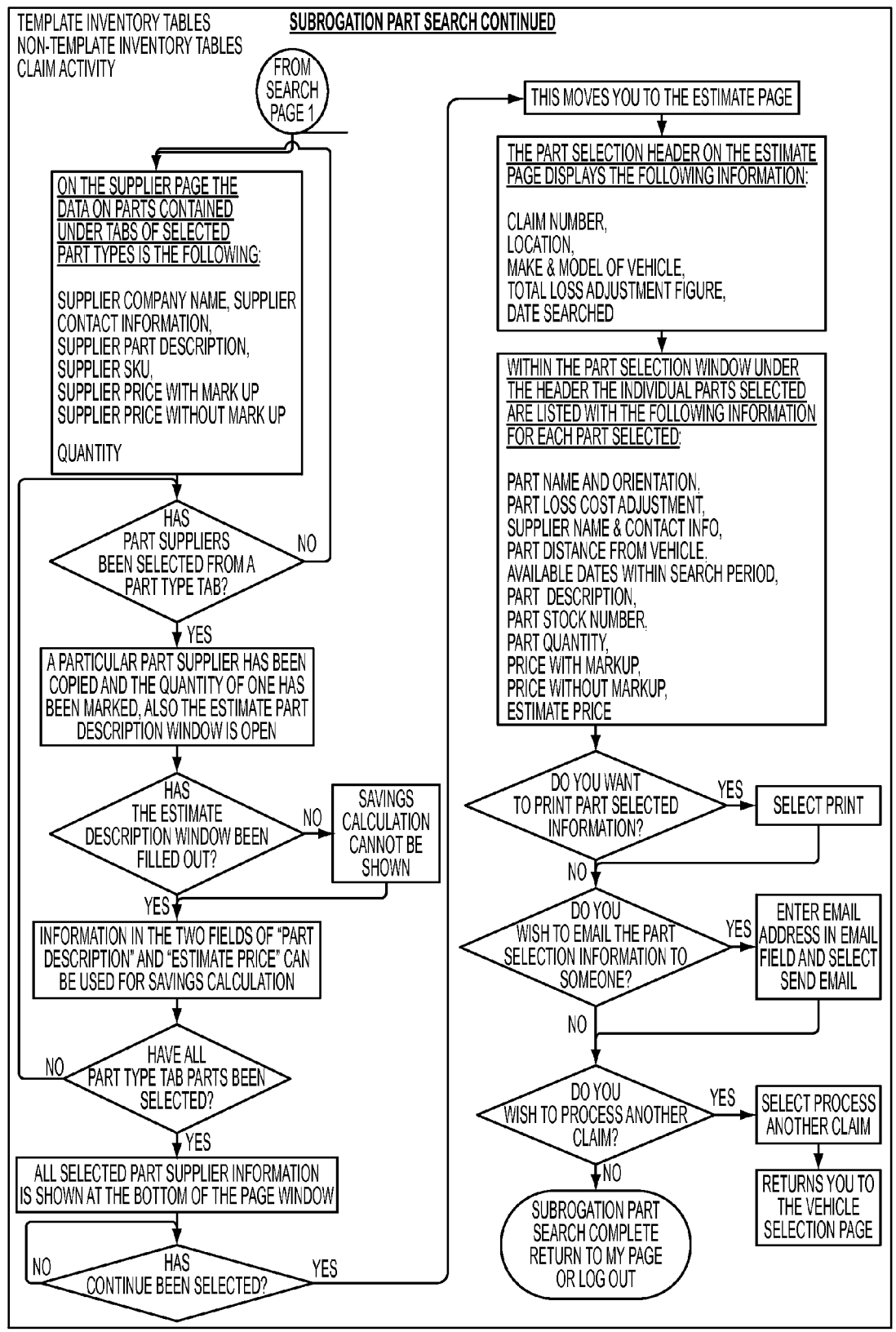
FIG. 6B shows an exemplary subrogation part search estimate page.

Referring to FIG. 6A, when the subrogation search is initiated, the user entity 106 is inquired whether it desires to select from the prior activity summary table. If the answer is yes, the act of selecting the particular claim of interest loads all pertinent information in the page where the user last left the search transaction, and this information is presented for review by the user. The user is then inquired whether they are editing a part selection. If yes, the user is advanced to the part supplier page with the selected part types on tabs with suppliers available summarized under each part type, as previously described. If the user indicates that it is not editing a part selection, the user is inquired whether they are reviewing a completed transaction. If yes, the estimate page as shown in FIG. 6B appears before the user, and the process continues as described above.

Figure 7:
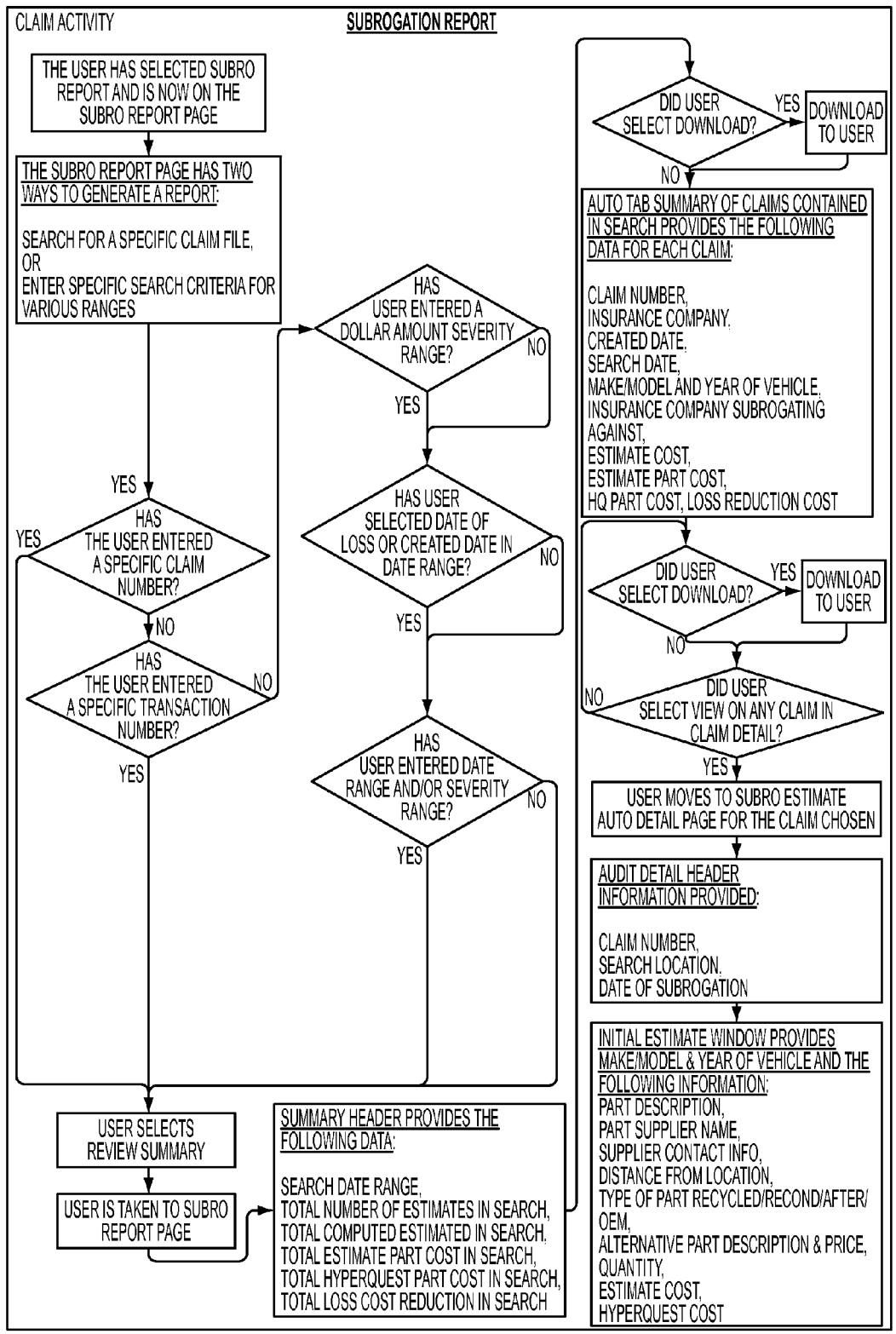
FIG. 7 illustrates the process of producing a subrogation report using an exemplary system in accordance with the present disclosure.

FIG. 7 illustrates the process of producing a subrogation report using the system 300. This process is initiated when the user selects the subrogation report option and is now on the subrogation report page. The subrogation report page offers two ways to generate a report. The user can either search for a specific claim file, or enter specific search criteria for various ranges. If the user selects a specific claim file search, the user is inquired whether a specific claim number has been entered. If yes, the user selects a review summary. If no, the user inquires whether a specific transaction number has been entered. If yes, the user again is advanced to the review summary. If no, the user is again inquired as to whether or not a specific claim number has been entered.

If the user answers no to the question whether a specific claim file search has been selected, the user is then inquired whether data has been entered into the alternate search area. If yes, the user is inquired whether a dollar amount of the severity range has been entered. If yes, the user is then inquired whether a selected date of the loss in the date range has occurred, and next the user is inquired whether a selected date has been created in the date range. Next, if the user enters a date range, the user is then prompted to the selection of the review summary by the user page. At this point, the user is advanced to the subrogation report page which has a summary heading providing the following data: the search date range, the total number of estimates in the search, the total computed estimate in the search, the total estimate part cost in the search, the total database part cost in the search, and the lost cost reduction in the search. The user is then prompted to select the download. If yes, the data is downloaded to the user. If no, the user is prompted to a page comprising an auto tab summary of claims contained in the search, providing the following data for each claim: claim number, insurance company, created date, search date, make/model and year of vehicle, insurance company subrogating against, estimate cost, estimate part cost, database part cost, and loss reduction cost.

The user now can select to download this table and then the user is prompted to select to view any claim in detail. If the user selects yes, the user is moved to a subrogation estimate auto detail page for the specific claim chosen. Next, a page appears with audit details including the claim number, the search location number and the date of the subrogation. Next, a window appears entitled initial estimate window providing make/model and year of vehicle and the following information: the part description, the part supplier name, the supplier contact information, the distance from the location, the type of part recycled/reconditioned/after market/OEM, alternative part description and price, quantity, estimate cost, and database cost.

Figure 8:
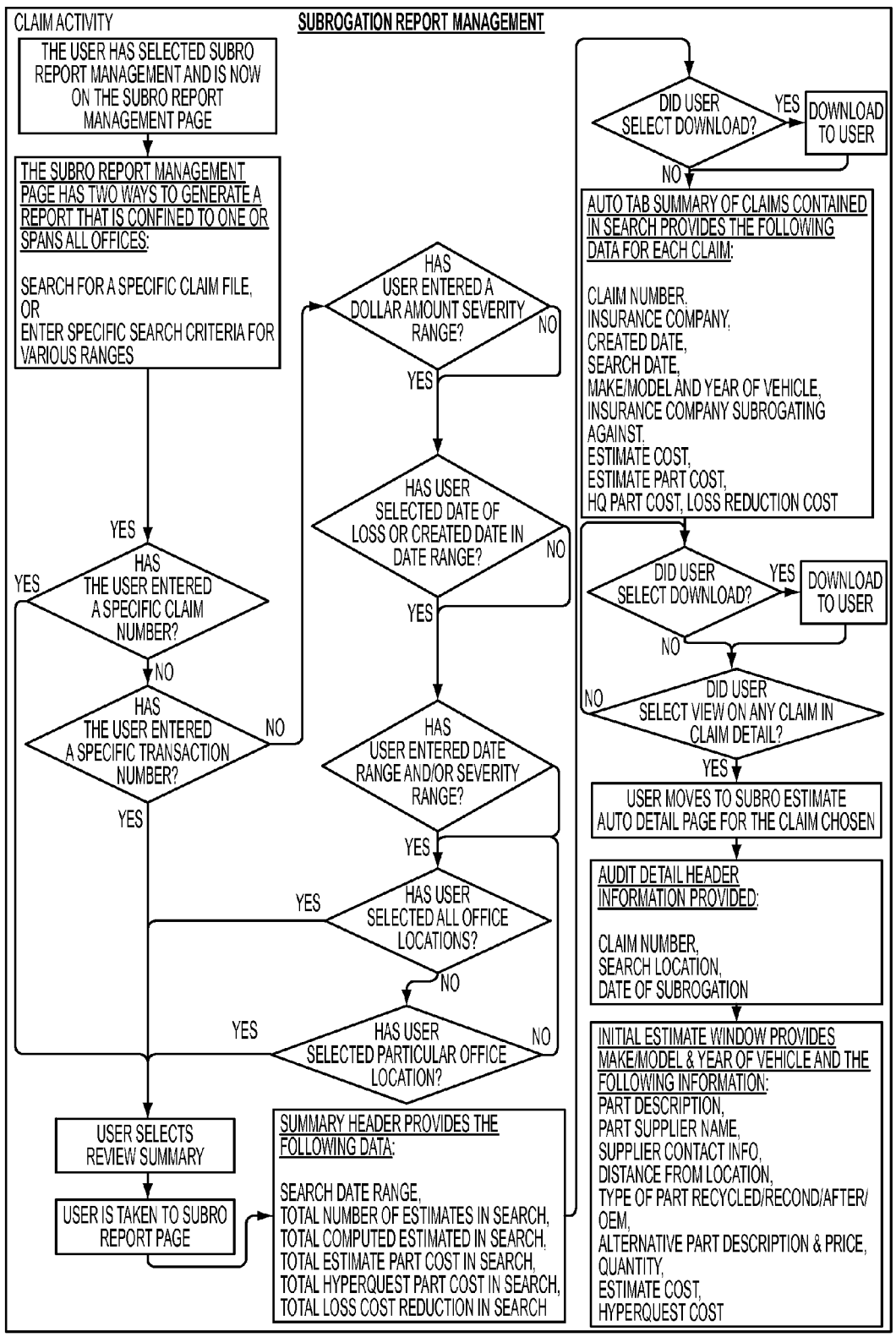
FIG. 8 sets forth a flow process when the user selects the subrogation report option as indicated in FIG. 5.

FIG. 8 sets forth a flow process when the user 310 selects the subrogation report option as indicated in FIG. 5. When that option has been selected, the user is now on the subrogation report management page which provides the user with an option of two ways to generate a report that is confined to one office, or spans all offices. These options are to search for a specific claim file or entry specific search criteria for various ranges. The user is then prompted to indicate whether it has selected a specific claim file search. If the answer is no, the user is prompted to respond whether data in the alternate search area has been entered, whether a dollar amount severity range has been entered, whether a selected date of loss and date range has been entered, whether a selected date was created in the date range, whether the user has entered a date range, whether the user has selected all office locations or whether the user has selected a particular office location. Once this inquiry has been completed the user is advanced to the review summary page.

Where the user 310 selects a specific claim file search, the user is then inquired whether a specific claim number has been entered, and whether a specific transaction number has been entered. If these questions are answered in the affirmative, the user is prompted to the review summary page.

From the review summary page, the user is advanced to a subrogation report page, where a summary header provides the following data: the search date range, the total number of estimates in the search, the total computed estimate in the search, the total estimate part cost in the search, the total database part cost in the search, and the total loss cost reduction. The user is then inquired whether it selects to download the data. If yes, the information is downloaded to the user, if no, a page appears titled auto tab summary of claims contained in search that provides the following data for each claim: claim number, insurance company, created date, search date, make/model and year of vehicle, insurance company subrogating against, estimate cost, estimate part cost, database part cost and the loss reduction cost.

The user is then inquired whether it has selected download. If yes, the above information is downloaded to the user. If no, the user is inquired whether it selects to view any claim in detail. If yes, the user is moved to the subrogation estimate auto detail page for the claim chosen, where a page appears: indicating the claim number, the search location and the date of subrogation.

Next, the user is prompted to an initial estimate window which provides the make/model and year of the vehicle and the following information: the part description, the part supplier name, the supplier contact information, the distance from the location, the type of part recycled/reconditioned, after market, OEM, ultimate part description and price, quantity, estimate cost, and database costs.

Figure 9A:
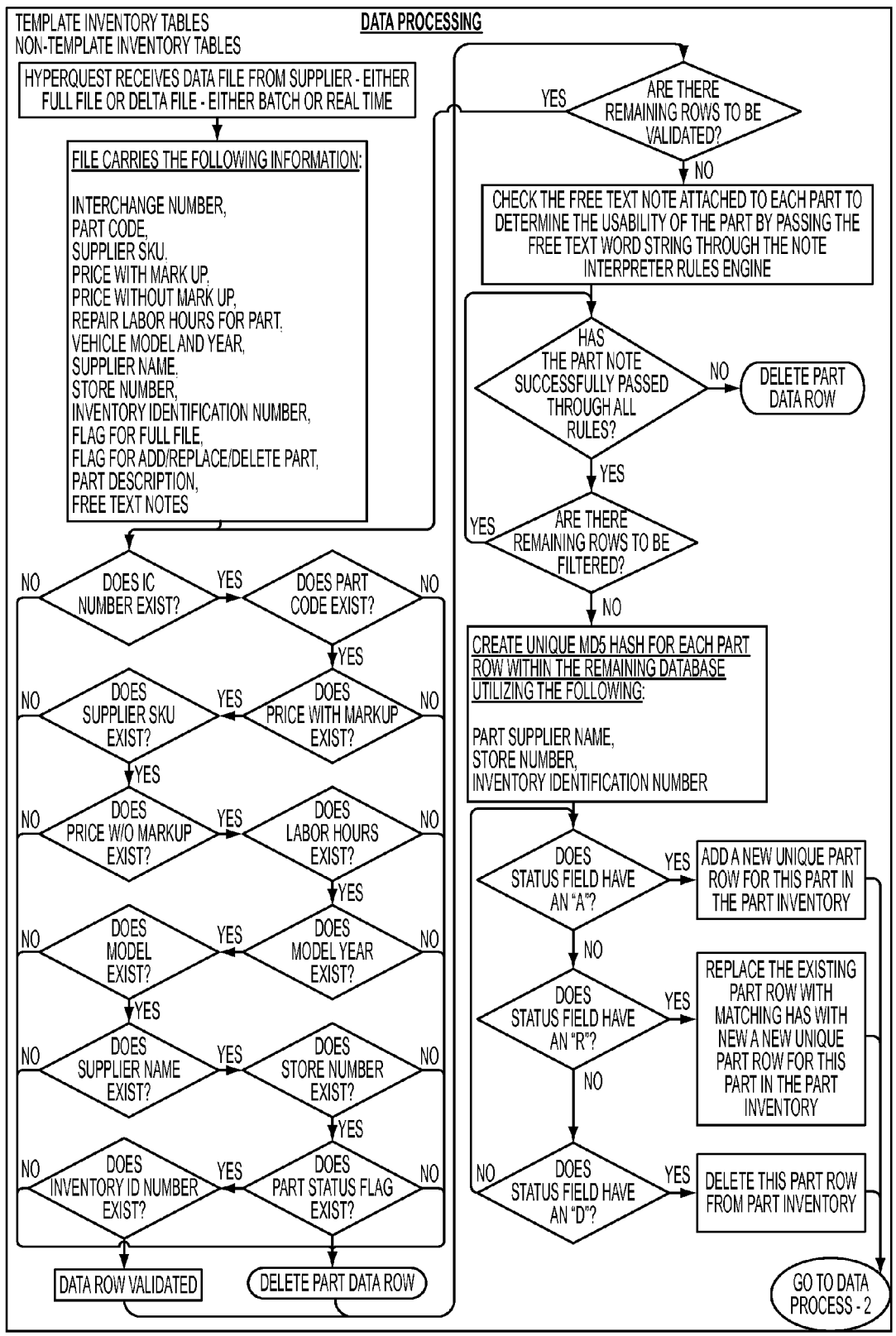
FIGS. 9A and 9B are flow diagrams of an exemplary data processing system in accordance with the present disclosure.
Figure 9B:
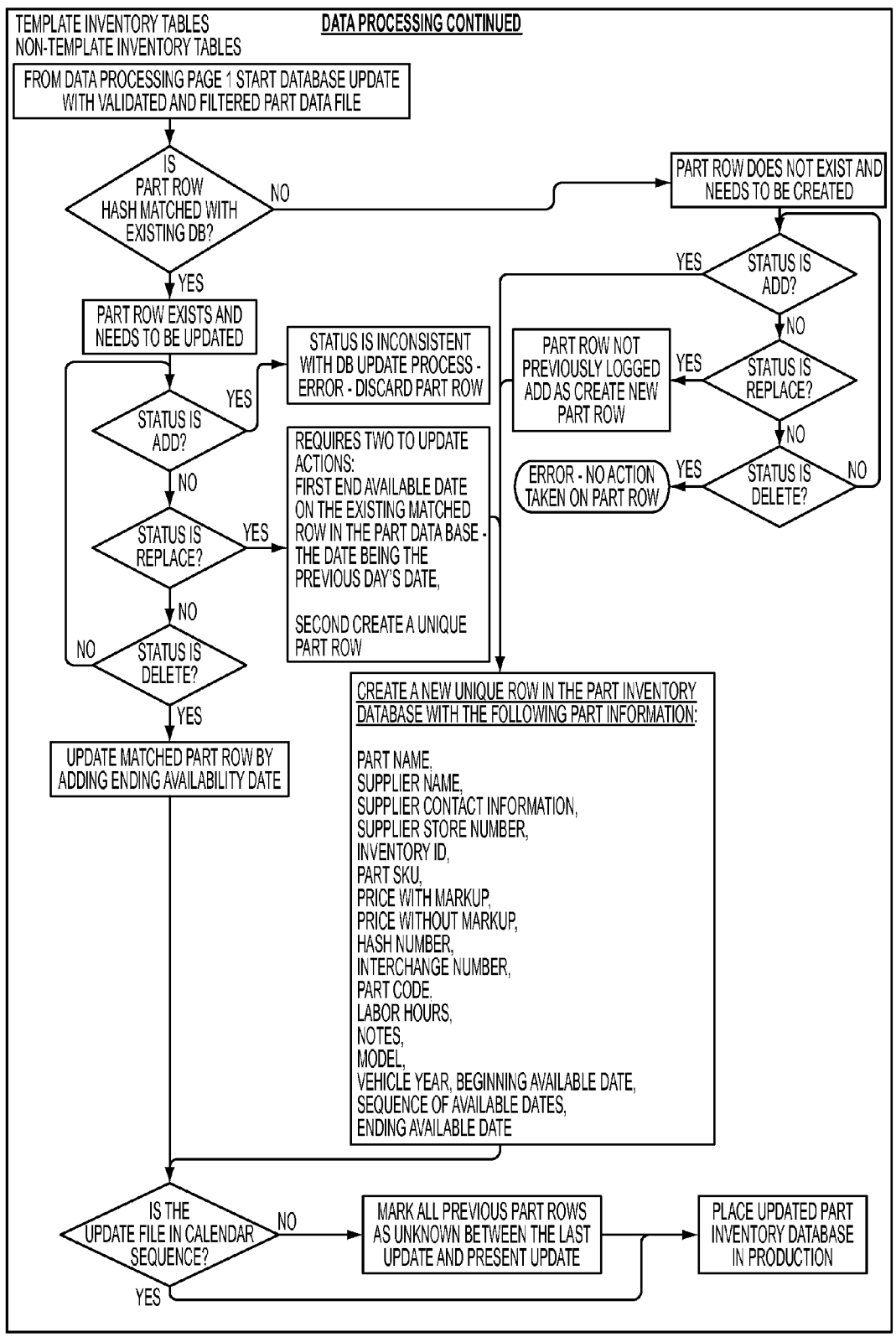

FIGS. 9A and 9B are flow diagrams disclosing the data processing system 300. Initially, the database 302 in central processing location 104 receives the data file from the supplier, either a full file or a delta file, and either a batch file or a real time file. The data file contains the following information: the Hollander interchange number, the Hollander part code, supplier SKU, price with markup, price without markup, repair labor hours for part, vehicle model and year, supplier name, store number, inventory identification number, flag for full file, flag for add/replace/delete part, part description, and free text notes.

The processor then inquires as to several factors, wherein a no response to any one of the factors may delete the part data row. A series of yes answers to these inquiries takes the user to the data row validated page. The inquiries that the processor is directed to inquire are:

1. Does an IC number exist;
2. Does a part code exist;
3. Does a price with markup exist;
4. Does a supplier SKU exist;
5. Does a price without markup exist;
6. Do labor hours exist;
7. Does the model year exist;
8. Does the model exist;

9. Does the supplier name exist;
10. Does the store number exist;
11. Does the part status flag exist; and
12. Does the inventory ID number exist?

A no response to any of these inquiries will direct the processor to delete the part data row. The processor determines whether there are remaining rows to be validated. If yes, the twelve inquiries mentioned above are again posed. If there are no remaining rows to be validated, the processor checks the free text note attached to each part to determine the usability of the part by passing the free text word string through the note interpreter rules engine. The processor then determines whether the part note has successfully passed through all of the rules. If no, the processor deletes the part data row. If the answer is yes, the processor determines whether there are remaining rows to be filtered. If yes, the user is directed to the above inquiry whether the part note successfully passes through all the rules. If the answer as to whether there are remaining rows to be filtered is no, the processor creates a unique MD five hash for each part row within the remaining data base utilizing the following information: part supplier name, store number, and inventory identification number.

The processor then determines whether the status field has a value of "A." If yes, a unique part row for this part is added in the part inventory. If no, the processor determines whether the status field has a value of "R". If the response is yes, the processor replaces the existing part row with matching hash with a new unique part row for this part in the part inventory. If the status field does not have an "R", the processor determines whether the status field has a value of "D". If the answer is yes, the processor will delete this part row from the part inventory. Following the inquiry regarding the status field, and referring to FIG. 9B, the processor starts the database update with validated and filtered part data and opens the responding file. The processor determines whether the part row hash matches the existing database. If the answer is no, the processor determines that the part row needs to be created. If the part row hash matches the existing database, the processor knows that the part row exists and needs to be updated. The processor then determines whether the status is either add, replace, or delete. If the status is to be added, the processor reads that the status is inconsistent with the database update process and there is an error, and the part row is discarded. If the response to the inquiry is to replace the status, two update actions are required. The first is to end the available date on the existing matched row in the part database—the date being the previous day's date. The second is to create a unique part row. If the inquiry response is to delete the status, the matched part row is updated by adding the ending availability date.

Where the status is to replace the part row, the two update actions set forth above are taken, and the processor then creates a new unique row in the part inventory database with the following part information: part name, supplier name, supplier contact information, supplier store number, inventory ID, part SKU, price with markup, price without markup, hash number, interchange number, part code, labor hours, notes, model, vehicle year, beginning available date, sequence of available dates, and ending available date. In addition, if the part row does not exist initially and needs to be created, all the data used to create the part row is also fed into the creation of the new unique row in the part inventory database as described above.

After the system 300 updates the matched part row by adding an ending availability date, or creates a new unique row in the part inventory database, the processor determines whether the update file is in a calendar sequence. If no, all previous part rows are marked as unknown between the last update and the present update. If the update file is in proper calendar sequence, the data processor places the updated part inventory database in production.

Figure 10:
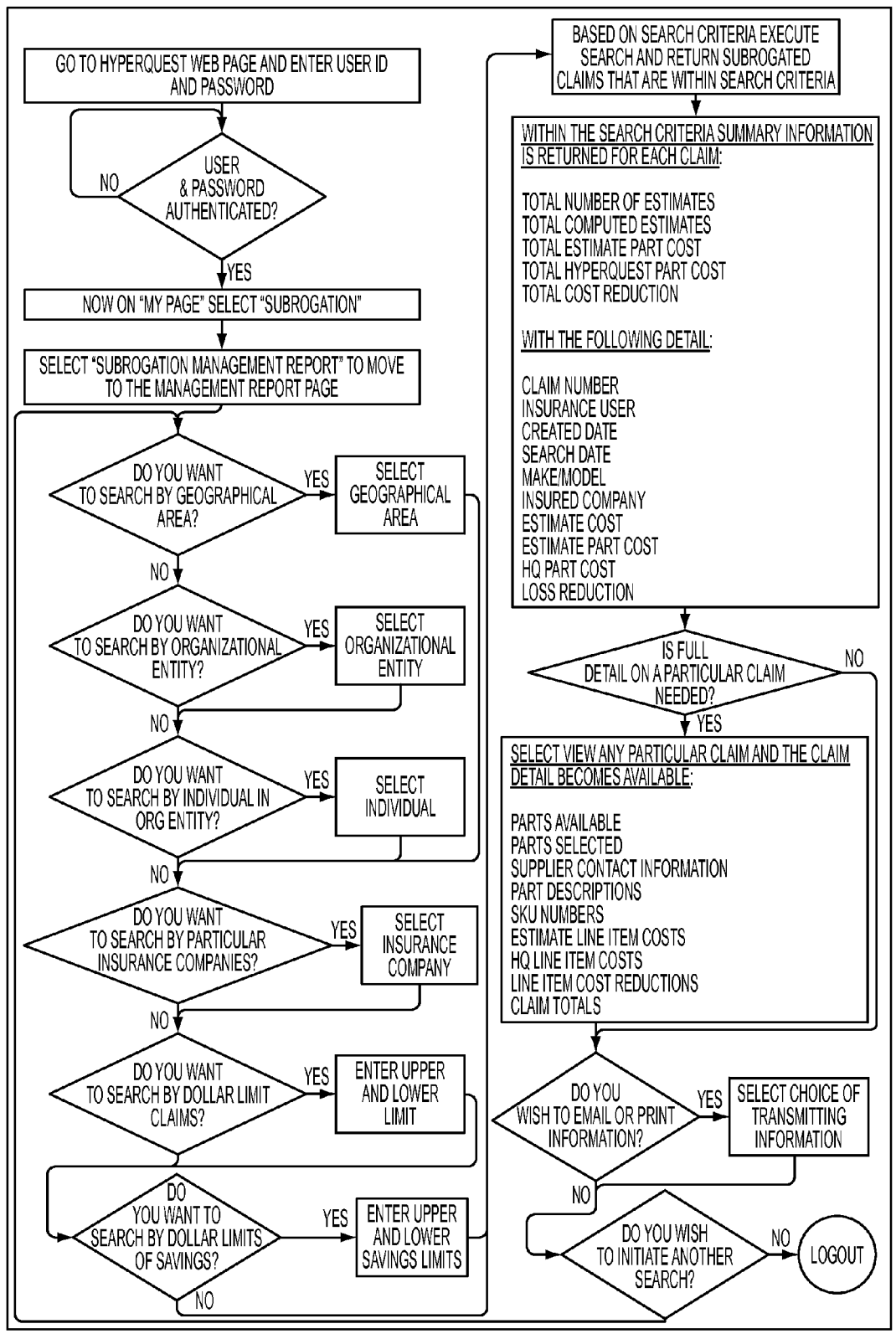
FIG. 10 is a flow diagram illustrating an exemplary administrative module in accordance with the present disclosure.

The administrative module is illustrated as a flow diagram in FIG. 10. The process begins by the user 310 bringing up the appropriate web page and entering the proper user ID and password. Once the user ID and password are authenticated, the user is directed to the "My Page" screen, where the user then selects "subrogation". Next, the user selects "subrogation management report" to move to the management report page.

The user is then prompted to select its search criteria parameters. The user is prompted to select if it desires a geographical area as one of its search parameters. If yes, the geographical area selected is added as a parameter. The user is prompted to select whether it desires to search by organizational entity as one of its search parameters. If yes, the user selects the organizational entity and that is added as a parameter. The user is prompted to select if it desires to search by one or more individuals in the organizational entity. If yes, the individual(s) are selected and added as a parameter. The user is inquired whether it desires to search by particular insurance companies. If the answer is yes, the user selects the appropriate insurance company and that is added as a parameter. The user is inquired whether it desires to search by dollar limits on claims. If yes, the user enters the upper and lower limit of the dollar amount as a parameter. The user then inquires whether to search by dollar limits of savings. If yes, an upper and lower savings limit is entered and used as a parameter.

If either a yes or no answer is given to the parameter inquiries, the process executes the search and returns subrogated claims that are within the search criteria. If no parameters are provided, the process returns all subrogated claims. Within the search criteria summary information is returned for each claim as follows: a total number of estimates, total computed estimates, total estimate part cost, total database part cost, and total cost reduction. The additional detail is also furnished: claim number, insurance user, created date, search date, make/model, insured company, estimate cost, estimate part cost, database part cost, and loss reduction.

The user 310 is then queried whether a full detail on a particular claim is needed. If yes, the user can select a view of any particular claim and the claim detail becomes available, including the parts available, the parts selected, supplier contact information, part descriptions, SKU numbers, estimate line item cost, database line item cost, line item cost reductions and claim totals. If the answer to the query whether a full detail on a particular claim is negative, and after the user selects the view of any particular claim, the user is then inquired whether it desires to email or print the information. If yes, the user can select the choice of transmitting the information. If no, the user is inquired as whether it desires to initiate another search. If the answer is yes, the user is directed to the beginning of the search process. If the answer is no, the user is directed to log out from the system.

Figure 11:
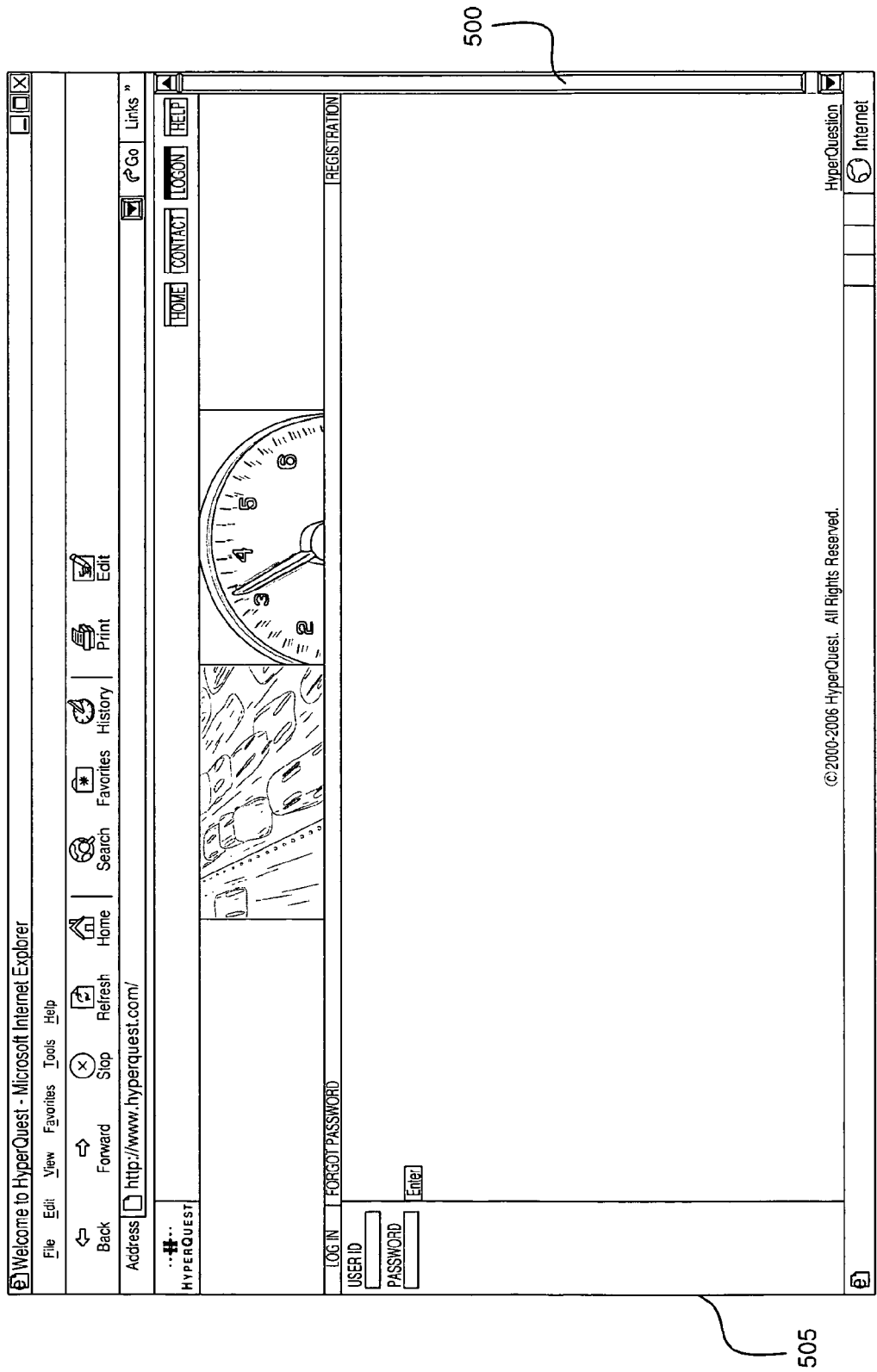
FIG. 11 shows an exemplary login screen.
Figure 12:
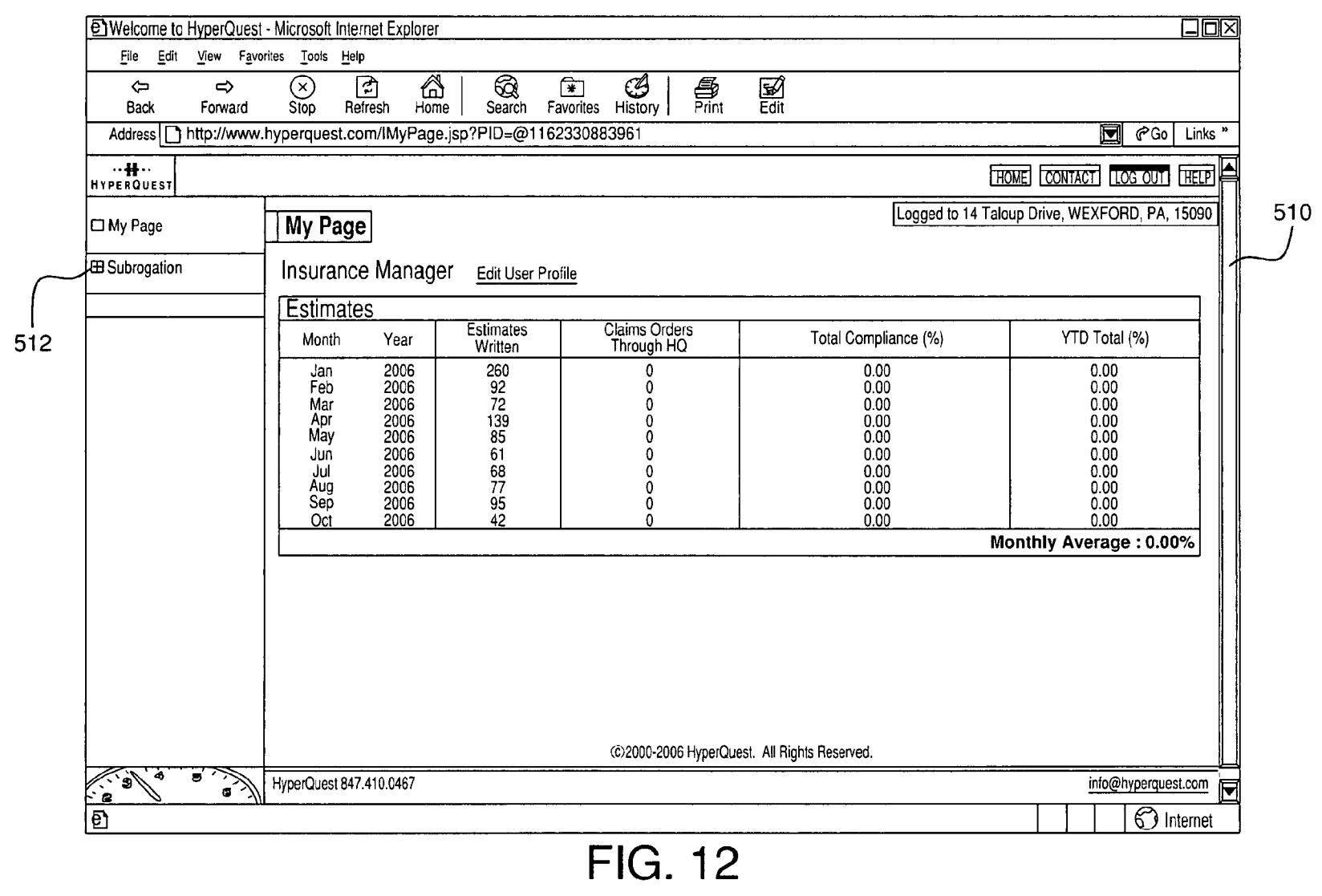
Figure 12A:
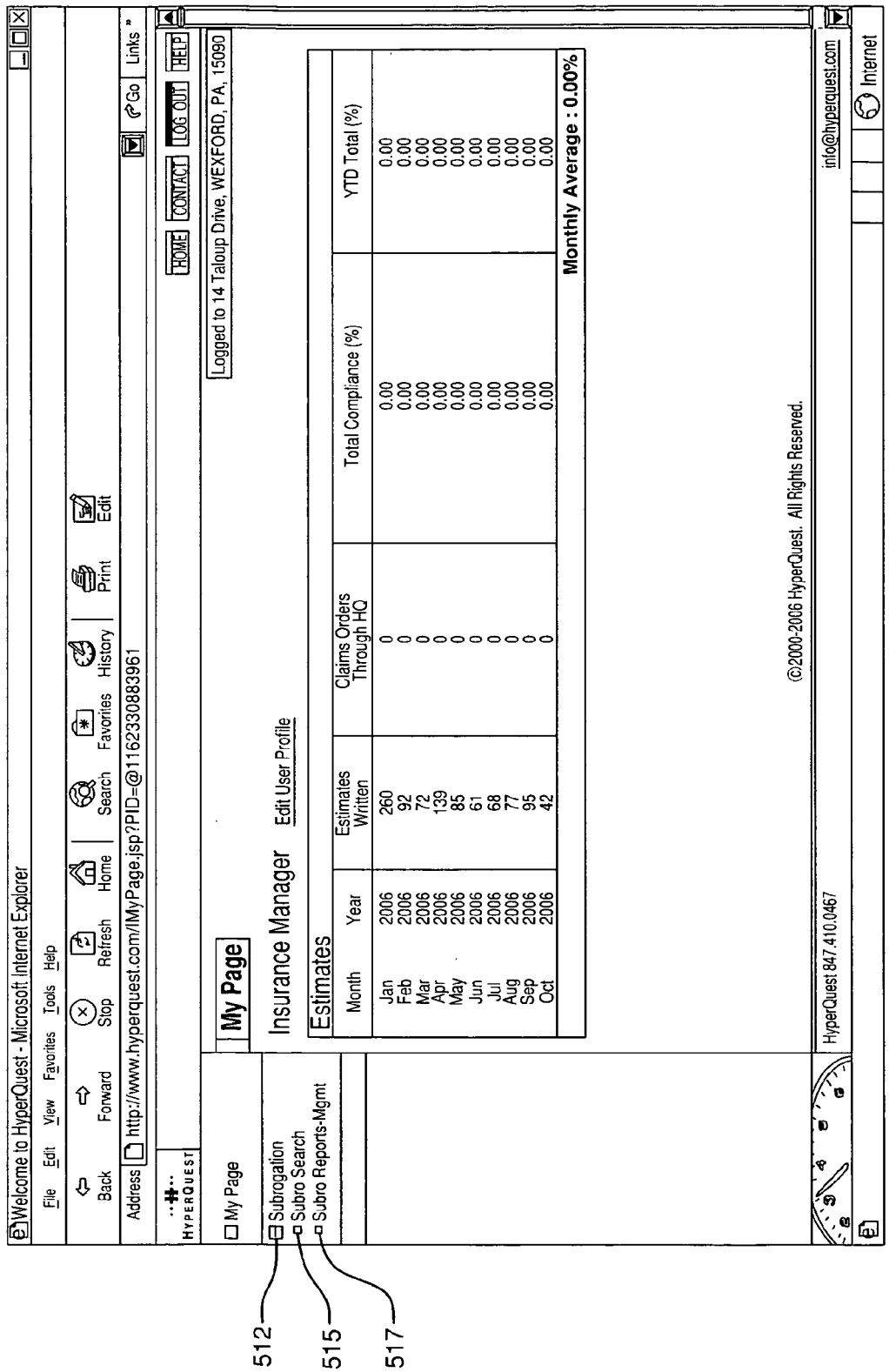
FIG. 12A shows an exemplary insurance manager summary screen after selecting subrogation.
Figure 13:
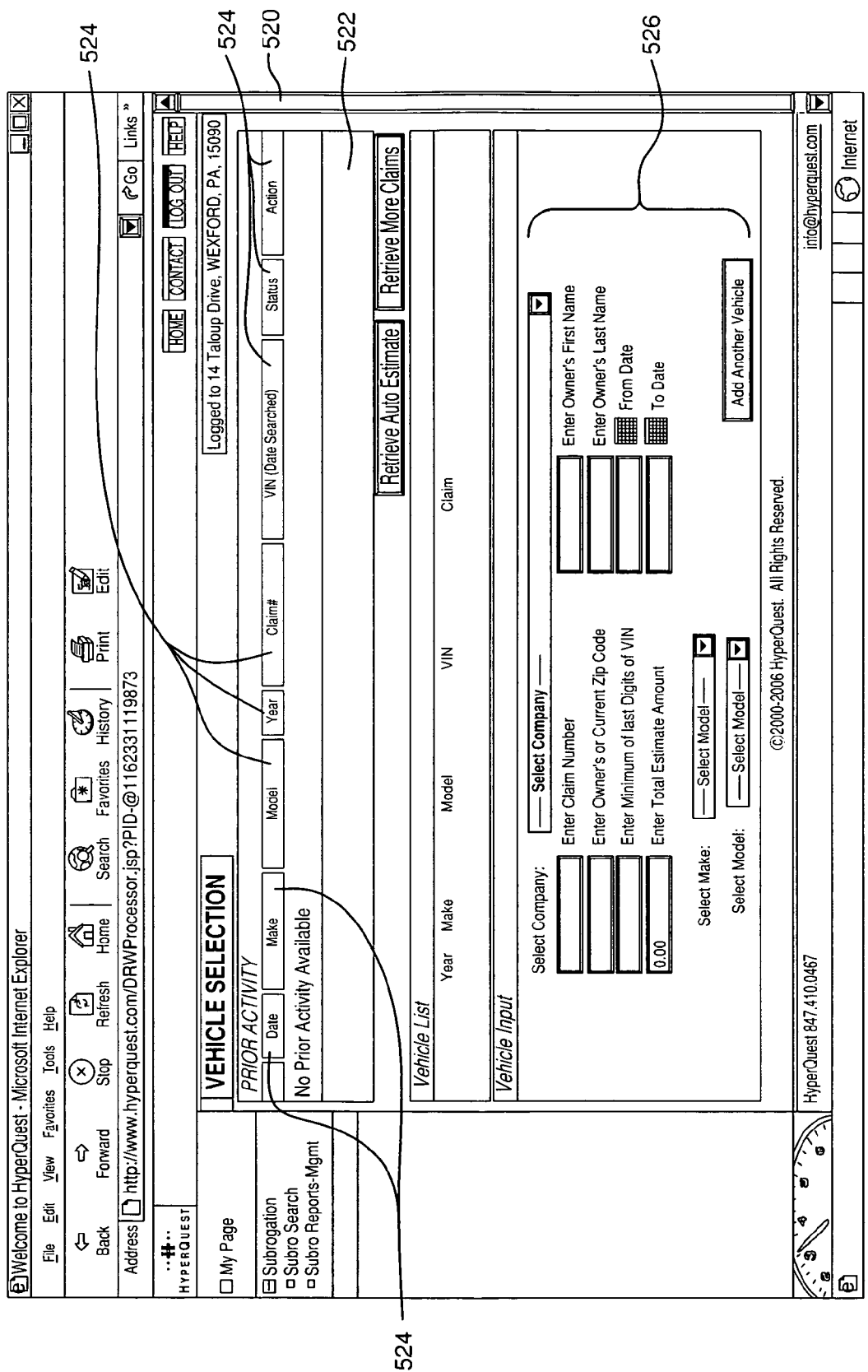
FIG. 13 shows an exemplary vehicle selection screen.

In one embodiment of the subrogation system, the user 310 can log in at the appropriate website with a pre-designated user ID and password at the login screen 500 (FIG. 11) to begin the subrogation search process. In operation, as shown in FIG. 11, the user 310 enters the user ID and password and then clicks the "enter" button 505 on the login screen 500. The user 310 is transferred to the Insurance Manager Summary screen 510 shown in FIG. 12. To enter the subrogation system, the user 310 clicks on the "Subrogation" link 512 also shown in FIG. 12. After selecting "Subrogation" 512, the user 310 is presented with two selection choices in FIG. 12A—"Subro Search" 515 and "Subro Search Management" 517. The user 310 selects "Subro Search" 515 to proceed with the search process and enter the vehicle and parts' selection screens. As best seen in FIG. 13, a user 310 can also view prior activity, if any, on the vehicle selection screen 520. The prior activity table 522 shows in process and completed activity for various other searches if available. Various column headings 524, also shown in FIG. 13, provide organizational structure for the table 522 and provide a user 310 with the ability to sort data in the table 522 by selecting and clicking on a particular column heading 524. For the illustrated search shown in FIG. 13, no prior activity is presently available.

Figure 13A:
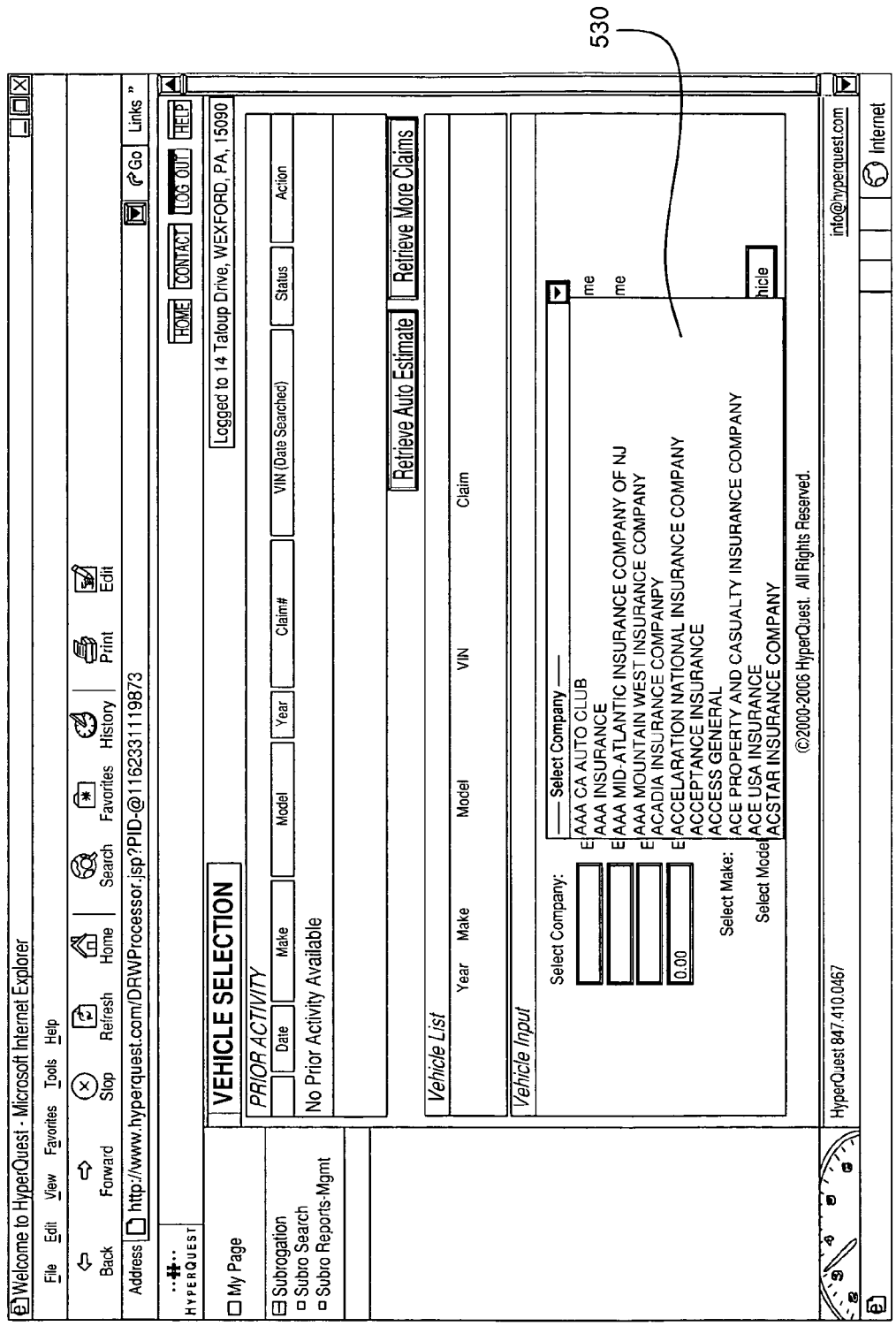
FIG. 13A illustrates the vehicle selection screen's company drop-down menu.
Figure 13B:
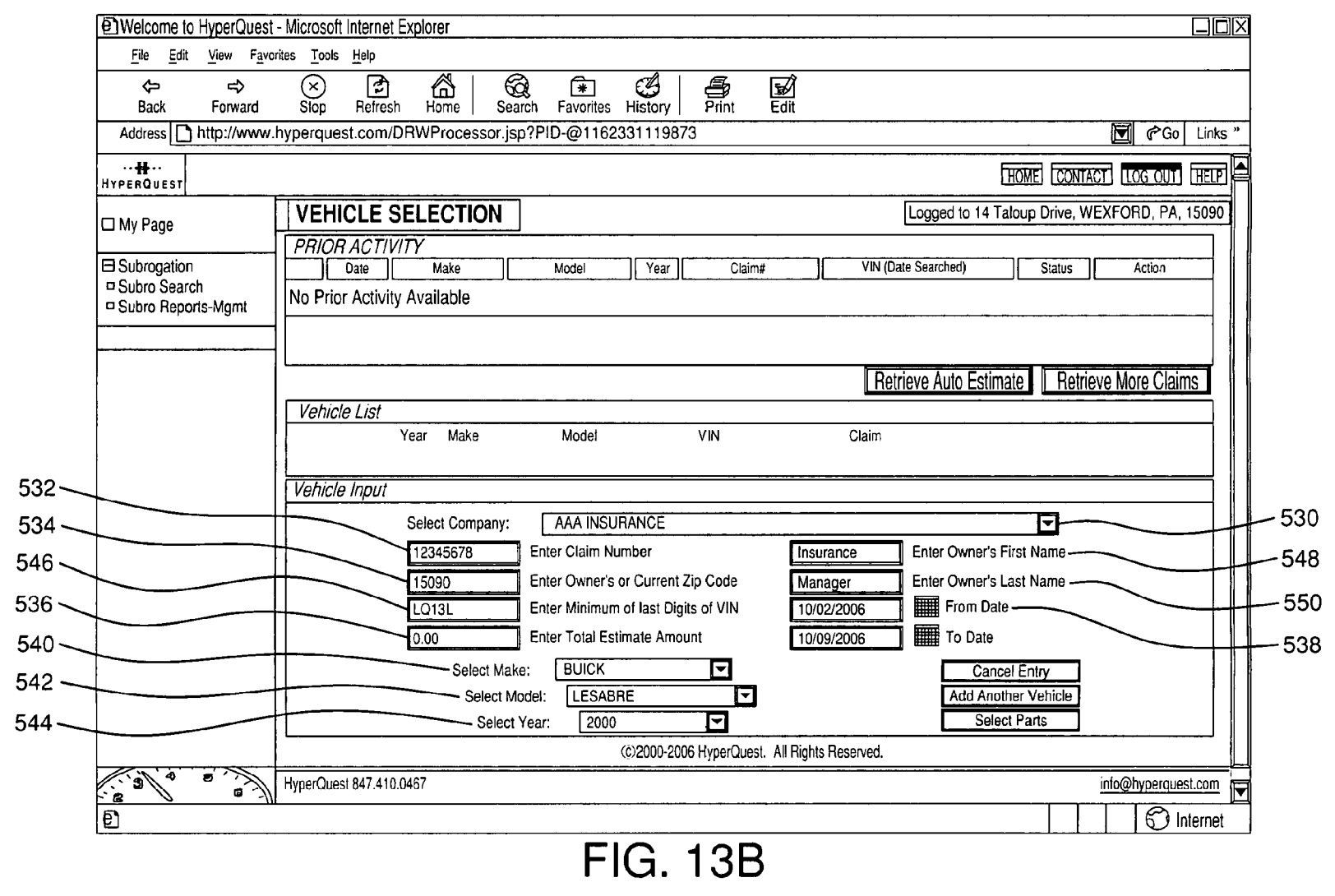

FIG. 13 further illustrates the data entry fields to begin a new subrogation search process for a specific new vehicle at 526. The user 310 first has an option to select a represented insurance company from the drop-down menu 530 shown in FIG. 13A. After selecting the insurance company at 530, the user 310 enters information in the fields for the claim number 532, the zip code 534, the total estimate amount 536, the "from date" 538, as well as make 540, model 542, and year 544. Make 540, model 542, and year 544 are selected from the drop-down menus as indicated in FIG. 13B. The VIN 546 field will auto-fill in the illustrated embodiment. If the system fails to auto-fill the VIN, it will be necessary for the user 310 to enter the last five digits of the vehicle's VIN. The fields for the owner's first name 548 and last name 550 will also automatically populate based on the system user 310. When all data is entered and the user 310 is ready to proceed through the system, the "Select Parts" 552 button should be selected to advance to the next screen and search for the parts required for cost estimation and availability.

Figure 14:
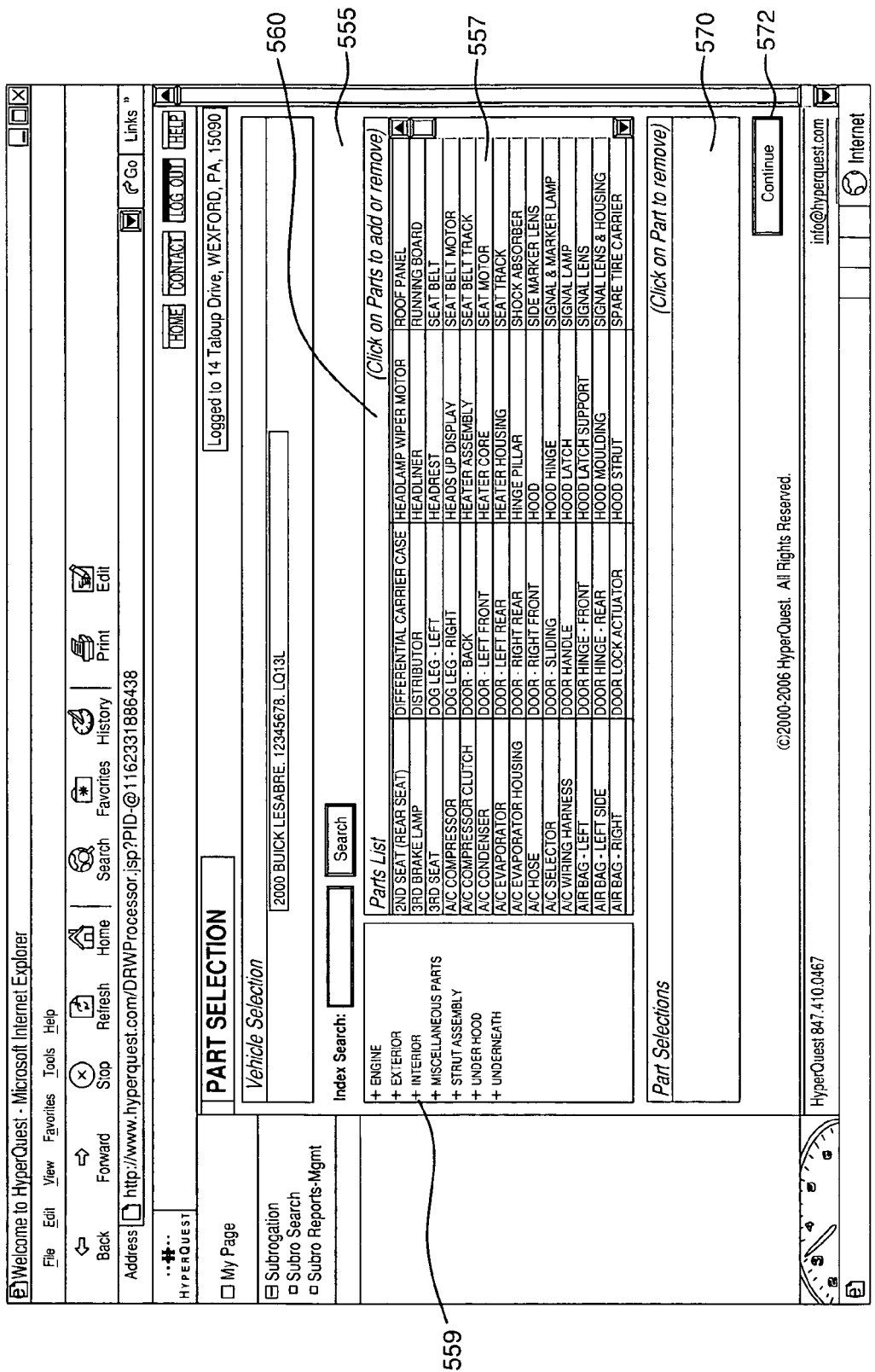
FIG. 14 shows an exemplary main parts search screen.
Figure 14A:
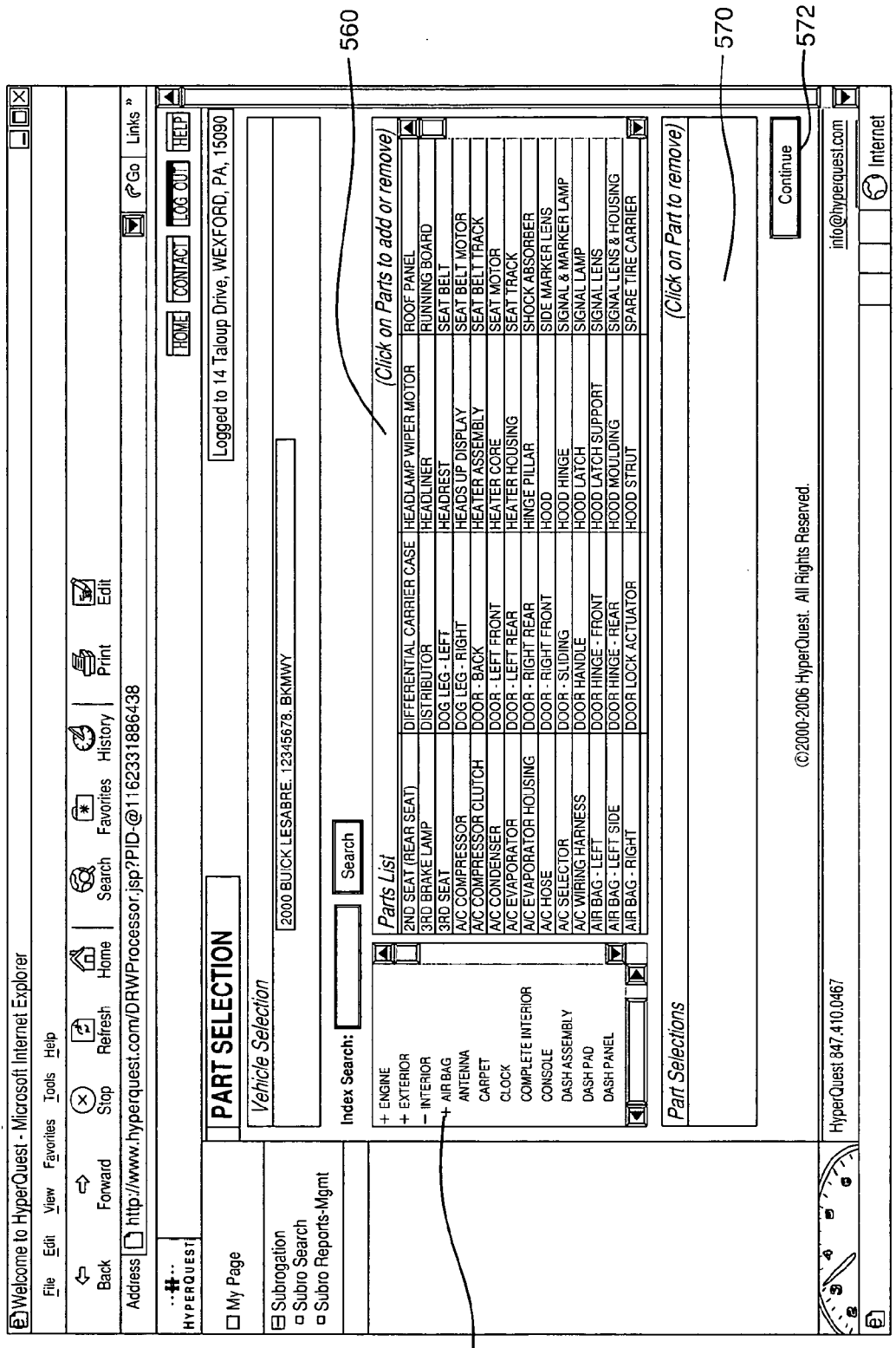
FIG. 14A is a view of the hierarchical search option for the main parts search screen.
Figure 14B:
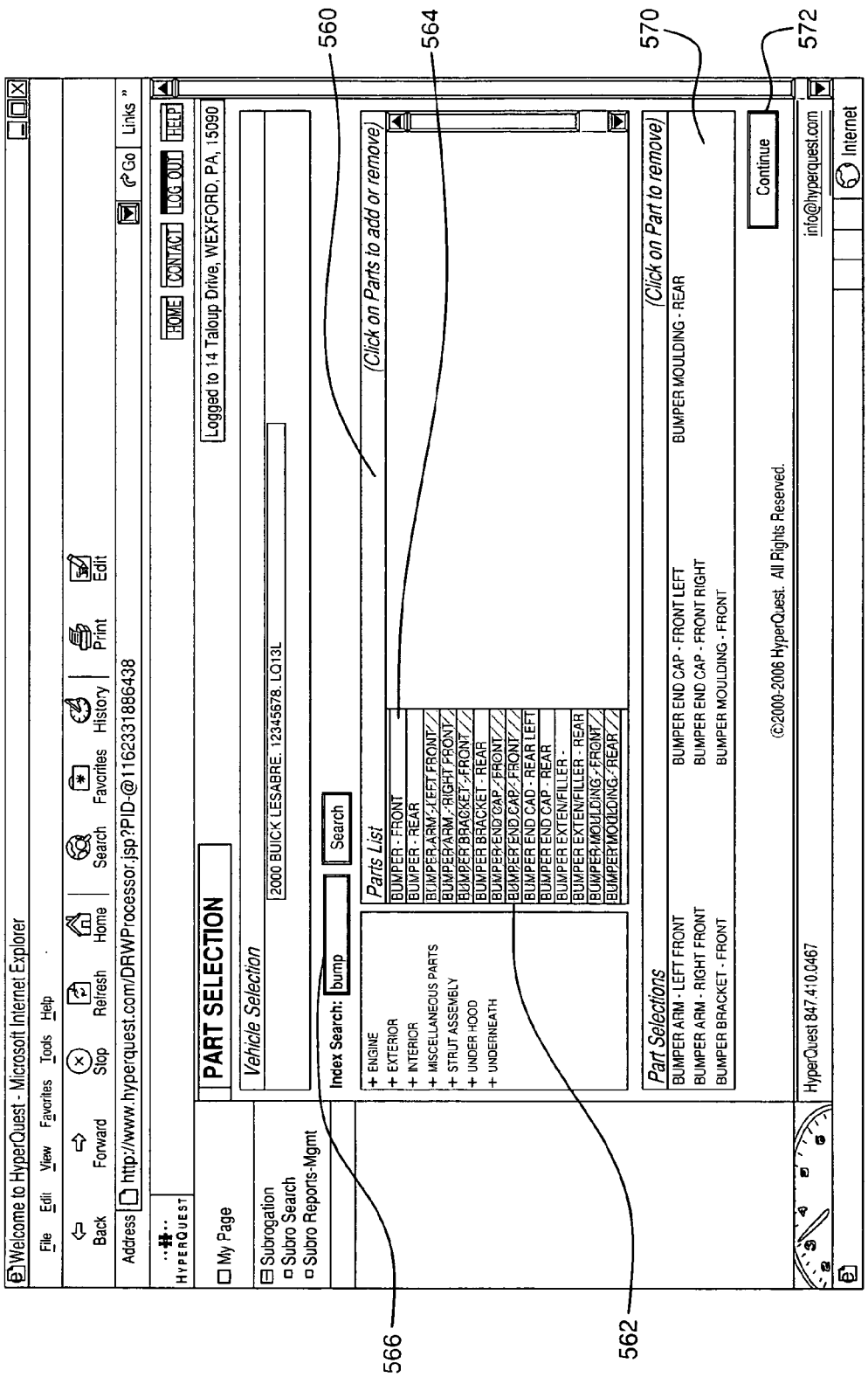
FIG. 14B is a view of the index search option for the main parts search screen.

FIG. 14 shows the main parts search screen 555 in the Subrogation system. A user 310 can search for parts in three ways. First, a user 310 may scroll through the parts listed alphabetically in the main table 557 in FIG. 14. Second, a user 310 may perform a hierarchical search by selecting a category at 559 to expand into sub-categories as shown in FIG. 14A for a narrower search. Third, a user 310 may perform an index search by entering a key word or words at 562 as shown in FIG. 14B. The system will provide a list of parts 564 containing those key words. The user 310 then selects the desired parts from the list by highlighting those entries as shown at 566 in FIG. 14B.

Parts selection in all three processes occurs via clicking on the part name in the "Parts List" box 560. Clicking on the part name a second time will de-select the part. All part selections will appear in the parts selection box 570. In FIG. 14B, the parts selections box 570 is populated with the parts selected by the user 310. To proceed through the system the user 310 then selects the "Continue" button 572 as seen in FIG. 14B.

Figure 15:
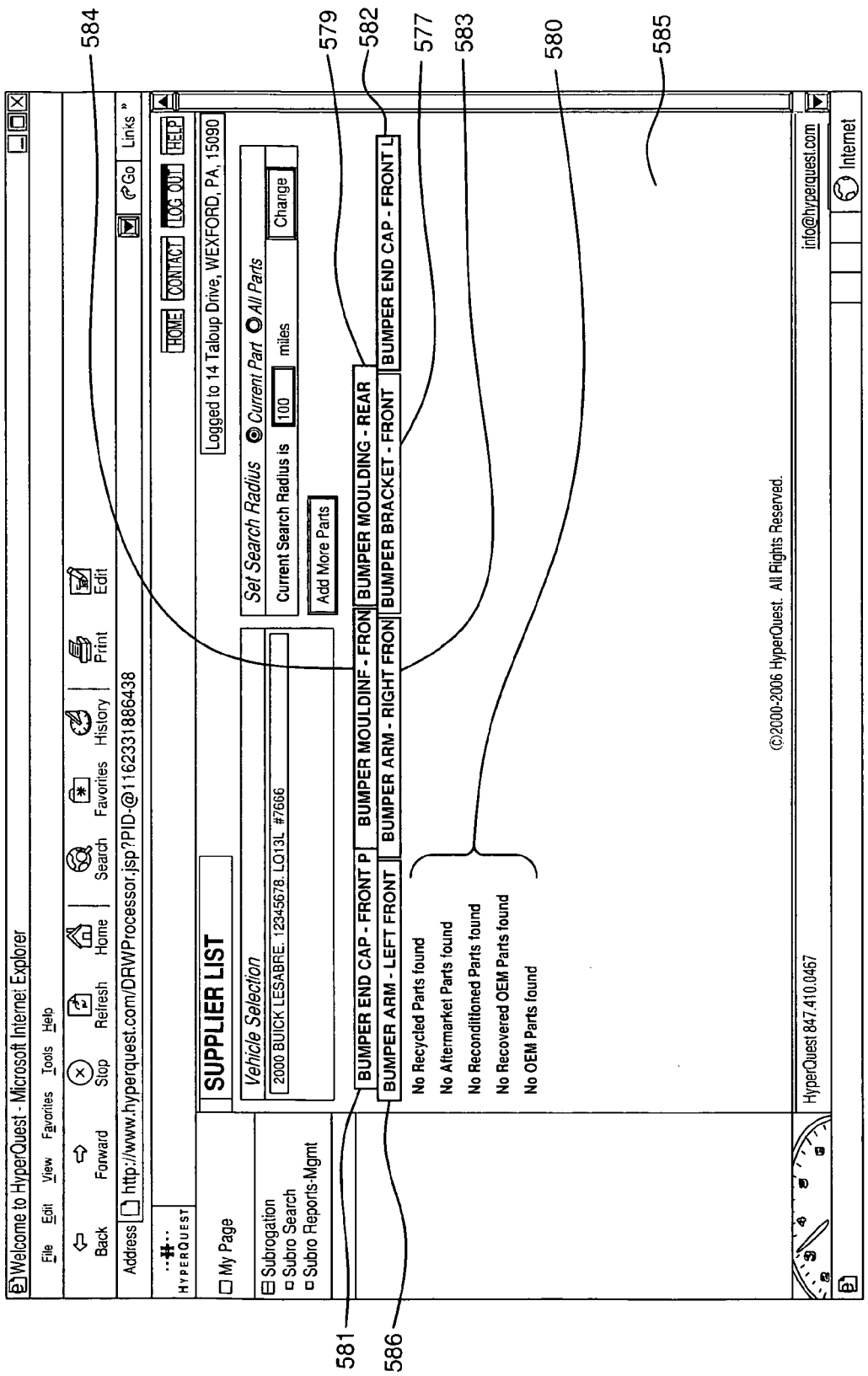
FIG. 15 shows an exemplary supplier list page screen.
Figure 15A:
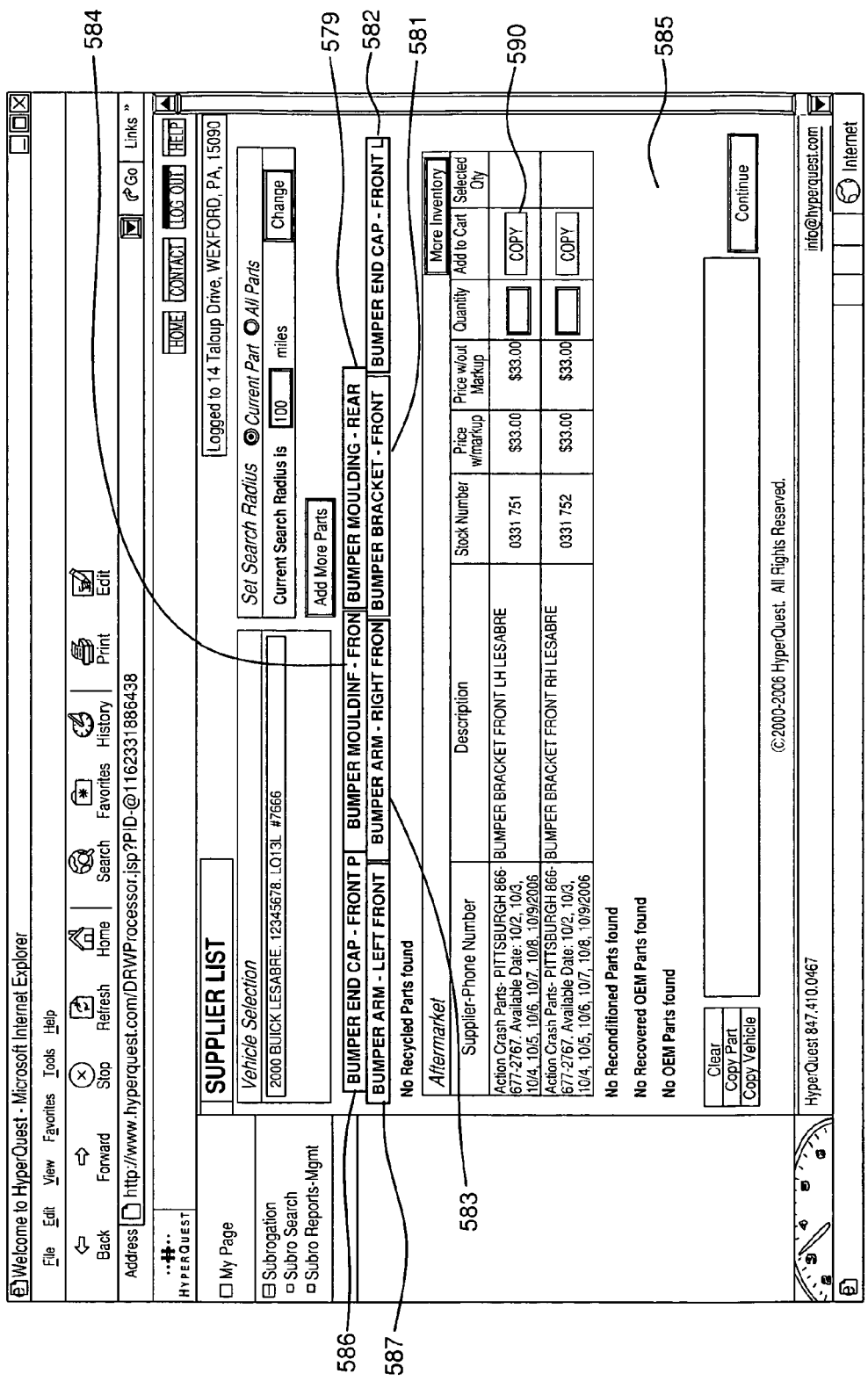
FIG. 15A is the supplier list page screen showing available aftermarket parts.
Figure 15B:
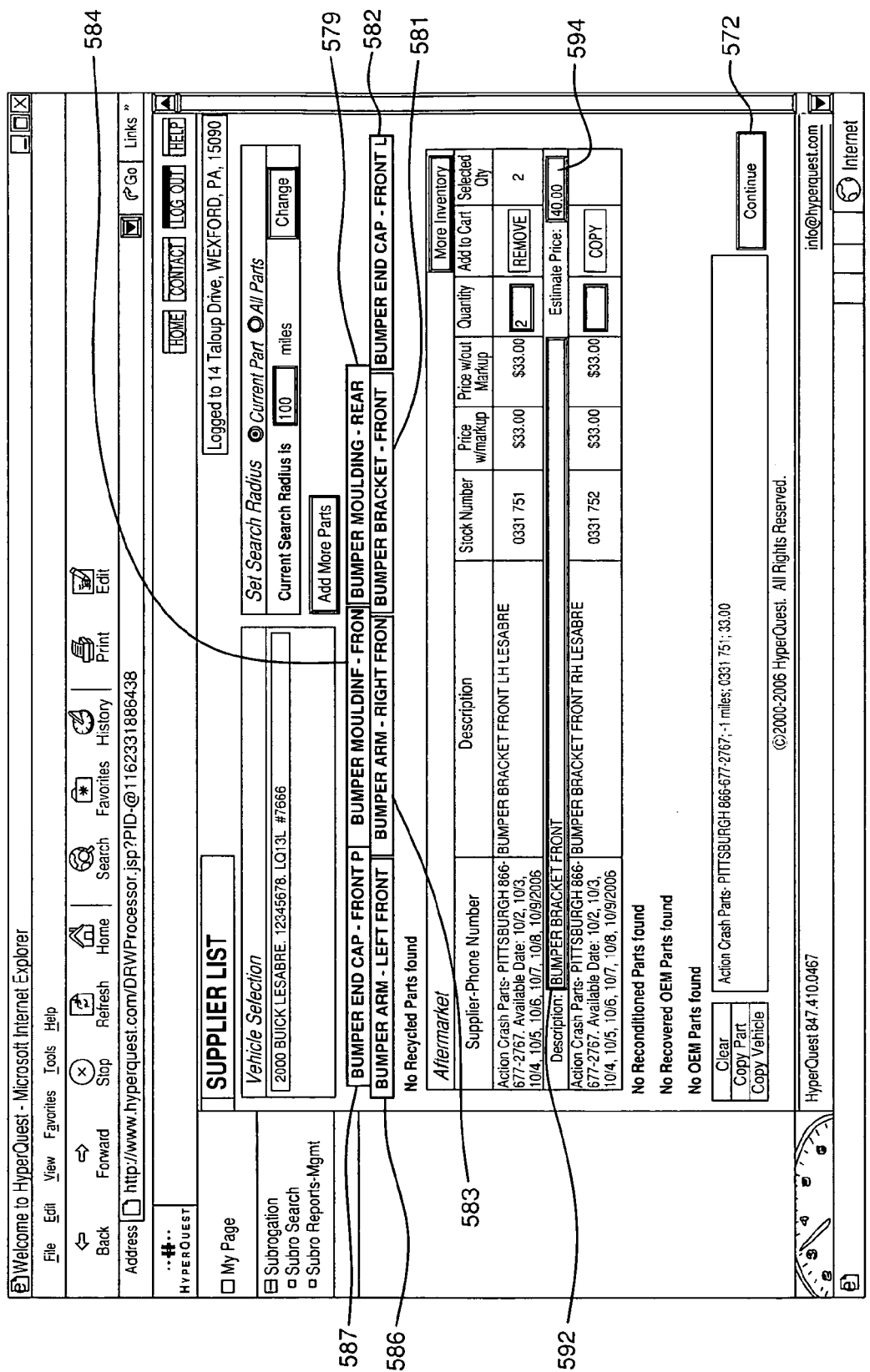
FIG. 15B is the supplier list page screen showing the user being prompted to enter a description.

The user 310 will then be presented with a "Supplier List Page" 575 screen. (FIG. 15) Tabs 577 associated with a particular selected part on the screen 575 denote the parts' availability. When a tab 577 is selected, a list of suppliers will be displayed by category. For example, Recycled, Aftermarket, OEM, Reconditioned, and Recovered OEM categories for suppliers shown at 580 may be listed on the screen 575. Supplier options and prices, if available, will be viewable directly below the parts tabs in the space indicated at 585. Tabs 579, 582, 583, 584, 586 and 587 as seen in FIGS. 15, 15A, and 15B denote that no parts are available. Tabs at 581 indicate that the part is currently selected for viewing, and available parts are visible in the space provided at 585. FIG. 15A shows available aftermarket parts in the space at 585 for the parts selected at 581. To choose a supplier for an available part, the user 310 will select the "Copy" button at 590. As best seen in FIG. 15B, the user 310 will then be prompted to enter a description at 592, if desired, and a parts price at 594 from the estimate being reviewed. After selecting and reviewing part availability at 596, the user 310 can proceed through the system to the "Estimate Submitted" screen by selecting the "Continue" button 572.

In FIG. 16 of the illustrated embodiment, the "Estimate Submitted" page 598 provides the user 310 with a printable document of part availability at the time of the original estimate. Information in this report can include the claim number, search location, make, model, and year information, and the date the search was performed. The system also can provide a lost cost adjustment at 599 which is the difference between part savings found through the system which were available at the time the original estimate was written and those used in the original estimate.

While the description above refers to particular embodiments of the present invention, it will be understood that many modifications may be made without departing from the spirit thereof. The accompanying claims are intended to cover such modifications as would fall within the true scope and spirit of the embodiments of the present invention.

What is claimed is:

1. A computer system for processing historical vehicle replacement part database queries, the computer system comprising:

a data preprocessing unit programmed to receive raw vehicle parts inventory data as input data, the raw vehicle parts inventory data including a digital representation of a supplier's vehicle parts inventory available at one or more given locations on a given date, and to preprocess the input data into historical vehicle replacement part database records, each record corresponding to a vehicle part in the supplier's inventory such that the database records represent availability of specific parts at the one or more given locations on the given date;

a database server coupled to the data preprocessing unit and programmed to store the historical vehicle replacement part database records in a database system to create a historical chronology of vehicle parts availability information and to perform processing to retrieve historical vehicle replacement part records from the database system;

a web server programmed to provide a service to a responding party client system, the service including an interface for receiving a user query from the responding party client system, the user query having data corresponding to information contained in a subrogation claim received from a demanding party, different from the responding party, the user query data including a first vehicle parts list representing vehicle parts in a repair estimate or which were actually used to repair a motor vehicle damaged in an accident involving a first motorist insured by the responding party and a second motorist insured by the demanding party, the repair estimate or the repair being authorized by only the demanding party; a make, model and year of the vehicle; a historical date of when the damage occurred or when the repair occurred; and a geographic area of interest, the geographic area of interest consisting of a sub-region of an area covered by the historical vehicle replacement part database records having the historical chronology of vehicle parts availability information, the sub-region including a geographic location of the repair, the web server further programmed to provide to the responding party client system and the demanding party a database query result having a second vehicle parts list including those parts corresponding to the parts in the first vehicle parts list and which were suitable for use on the make, model and year of the vehicle that was damaged in the accident and which were available on the historical date when the damage occurred or when the repair occurred, were located within the geographic area of interest on the historical date when the damage occurred or when the repair occurred, and which conform to a rule set, the database query result including data received from the database server in response to a database query comprising information from the user query and information from the rule set, the web server being further programmed to verify automatically the accuracy of the subrogation claim by comparing the database query result with the subrogation claim information to generate a subrogation claim accuracy verification result, and to generate automatically an independent subrogation claim value based only on the subrogation claim accuracy verification result, the subrogation claim accuracy verification result and the independent subrogation claim value being adapted to provide a documentation basis for negotiating the subrogation claim; and an application server programmed to connect operatively to the database server and to the web server and to generate dynamic content for transmitting to the client system, the dynamic content including a user interface adapted to receive user input and to output result data based only upon the database query result, the subrogation claim accuracy verification result and the independent subrogation claim value.

2. The computer system of claim 1, wherein the rule set includes vehicle parts guidelines of the user, vehicle parts guidelines of a second party, a set of custom vehicle parts guidelines, or a combination thereof.

3. The computer system of claim 1, wherein the historical date includes a historical date range.

4. The computer system of claim 1, wherein the geographic area of interest includes a user modifiable location and radius.

5. The computer system of claim 1, wherein the database query result further includes a price for each part as of the historical date, a type of each part, a supplier name and contact information for each part, a description of each part and a distance of each part from a location associated with the use of the part in a vehicle repair or from a user specified location.

6. The computer system of claim 1, wherein a change in a non-terminal aspect of a historical vehicle replacement part record is added to the database system as an additional database record to track the change in the non-terminal aspect.

7. A computerized method for processing historical vehicle replacement part database queries, the computerized method comprising:

receiving input data at a data preprocessing unit, the input data including a digital representation of vehicle parts in a supplier's vehicle parts inventory;

preprocessing the input data using the data preprocessing unit to generate historical vehicle replacement part database records each corresponding to one of the vehicle parts in the supplier's vehicle parts inventory, the preprocessing including converting part name and description information for each part into a unique part identifier associated with each part record to permit location of a part record using translation of the part name and description information into a corresponding part identifier;

storing each historical vehicle replacement part database record in a database system using a database server coupled to the data preprocessing unit;

receiving a user query at a web server, the user query being transmitted by a responding party client system, the user query having data corresponding to information contained in a subrogation claim received from a demanding party, different from the responding party, the user query data including a first vehicle parts list, a vehicle make, model and year, a historical date, and a geographic area of interest;

transmitting the user query to an application server coupled to the web server by a data network, the application server being programmed to connect operatively to the database server and to the web server over the data network;

generating a database query comprising information from the user query and information from a rule set, the database query being generated by the application server;

querying, at the application server, the database system by sending the database query to the database server;

receiving a database query result from the database server at the application server, the database query result being responsive to the querying, the database query result including a second list of vehicle parts matching the database query, the second list of vehicle parts including those parts corresponding to the parts in the first vehicle parts list and which are suitable for use on the vehicle make, model and year and which were available on the historical date, were located within the geographic area of interest, and which conform to a rule set;

verifying automatically, at the application server, the accuracy of the subrogation claim by comparing the database query result with the subrogation claim information to generate a subrogation claim accuracy verification result;

generating automatically, at the application server, an independent subrogation claim value based only on the subrogation claim accuracy verification result;

generating dynamic content for transmitting to the client system using the application server, the dynamic content including a portion of the database query result and the independent subrogation claim value; and transmitting the dynamic content to the client system in response to the user query received from the client over an external communication link.

8. The computerized method of claim 7, further including:

searching the database for a part identifier based on the user query;

searching the database for another part identifier that is interchangeable with the part identifier;

loading a filtering process with a portion of the rule set relevant to the database query; and refining the database query result according to the rule set by using the filtering process to remove parts from the database query result that are not acceptable for use according to the rule set.

9. The computerized method of claim 7, wherein the rule set includes vehicle parts guidelines of the user, vehicle parts guidelines of a second party, a set of custom vehicle parts guidelines, or a combination thereof.

10. The computerized method of claim 7, wherein the historical date includes a historical date range.

11. The computerized method of claim 7, wherein the geographic area of interest includes a location and a radius.

12. The computerized method of claim 7, wherein the database query result further includes a price for each part as of the historical date, a type of each part, a supplier name and contact information for each part, a description of each part and a distance of each part from a location associated with the use of the part in a vehicle repair or from a user specified location.

13. The computerized method of claim 7, wherein a change in a non-terminal aspect of one of the historical vehicle replacement part records is added to the database system as an additional database record such that the change in the non-terminal aspect is tracked in the database system.

14. A non-transitory computer readable medium having stored thereon software instructions for processing historical vehicle replacement part database queries, the software instructions including a first portion, a second portion, a third portion and a fourth portion, the first portion, when executed by a first processor, causes the first processor to perform operations comprising:
receiving input data at a data preprocessing unit, the input data including a digital representation of vehicle parts in a supplier's vehicle parts inventory;
preprocessing the input data using the data preprocessing unit to generate historical vehicle replacement part database records each including a part identifier corresponding to one of the vehicle parts in the supplier's vehicle parts inventory, the part identifier being generated based on part name and description;

the second portion, when executed by a second processor, causes the second processor to perform operations comprising:
storing each historical vehicle replacement part database record in a database system using a database server coupled to the data preprocessing unit;
retrieving one or more historical vehicle replacement part database records based on a received query;

the third portion, when executed by a third processor, causes the third processor to perform operations comprising:
receiving a user query at a web server, the user query being transmitted by a responding party client system, the user query having data corresponding to information contained in a subrogation claim received from a demanding party, different from the responding party, the user query data including a first vehicle parts list, a vehicle make, model and year, a historical date range, and a geographic area of interest;
transmitting the user query to an application server coupled to the web server by a data network, the application server being programmed to connect operatively to the database server and to the web server over the data network;

the fourth portion, when executed by a fourth processor, causes the fourth processor to perform operations comprising:
generating a database query comprising information from the user query and information from a rule set, the database query being generated by the application server;
querying the database system using the database query at the application server;
receiving a database query result from the database server at the application server, the database query result being responsive to the querying, the database query result including a second list of vehicle parts matching the database query, the second vehicle parts list including those parts corresponding to the parts in the first vehicle parts list and which are suitable for use on the make, model and year of the vehicle and which were available during the historical date range, were located within the geographic area of interest, and which conform to a rule set;
generating dynamic content for transmitting to the client system using the application server, the dynamic content including result data based upon the database query result and an independent subrogation claim value based only on the subrogation claim accuracy verification result generated by comparing the database query result with the subrogation claim information to generate a subrogation claim accuracy verification result; and
transmitting the dynamic content to the web server in response to the user query received from the client such that the web server provides the dynamic content to the client over an external communication link in response to the user query.

15. The computer readable medium of claim 14, wherein the software instructions are adapted for execution by a distributed processing system.

16. The computer readable medium of claim 14, wherein the database query result further includes a price for each part during the historical date range, a type of each part, a supplier name and contact information for each part, a description of each part and a distance of each part from a location associated with the use of the part in a vehicle repair or from a user specified location.

* * * * *